United States Patent
Oddsen, Jr.

(10) Patent No.: US 7,066,433 B2
(45) Date of Patent: Jun. 27, 2006

(54) ARM APPARATUS FOR MOUNTING ELECTRONIC DEVICES WITH CABLE MANAGEMENT SYSTEM

(75) Inventor: Odd N. Oddsen, Jr., Easton, PA (US)

(73) Assignee: Innovation Office Products, Inc., Easton, PA (US)

( * ) Notice: Subject to any disclaimer, the term of this patent is extended or adjusted under 35 U.S.C. 154(b) by 0 days.

(21) Appl. No.: 10/850,640

(22) Filed: May 21, 2004

(65) Prior Publication Data

US 2004/0222344 A1 Nov. 11, 2004

Related U.S. Application Data

(60) Division of application No. 10/448,769, filed on May 30, 2003, which is a division of application No. 09/776,355, filed on Feb. 2, 2001, now Pat. No. 6,609,691, which is a continuation-in-part of application No. 09/406,006, filed on Sep. 24, 1999, now Pat. No. 6,409,134.

(60) Provisional application No. 60/191,266, filed on Mar. 22, 2000, provisional application No. 60/138,120, filed on Jun. 7, 1999.

(51) Int. Cl.
*F16M 11/00* (2006.01)

(52) U.S. Cl. ................. 248/200; 248/300
(58) Field of Classification Search .......... 248/200, 248/282.1, 300, 903
See application file for complete search history.

(56) References Cited

U.S. PATENT DOCUMENTS

| | | | |
|---|---|---|---|
| 376,617 A | 1/1888 | Vance | |
| 999,283 A | 8/1911 | White | |
| 2,151,877 A | 3/1939 | Walker | |
| 3,131,900 A | 5/1964 | Anderson et al. | |
| 3,409,261 A | 11/1968 | Leporati | |
| 3,424,419 A | 1/1969 | Siegel | |
| 3,436,046 A | 4/1969 | Valeska | |
| 3,489,383 A | 1/1970 | Anson | |
| 4,146,205 A * | 3/1979 | Skinner | 248/346.02 |
| 4,159,093 A | 6/1979 | Hamilton | |
| 4,266,747 A | 5/1981 | Souder, Jr. et al. | |
| 4,437,638 A | 3/1984 | Scheibenpflug | |
| 4,447,031 A | 5/1984 | Souder, Jr. et al. | |
| 4,494,177 A | 1/1985 | Matthews | |
| 4,523,732 A | 6/1985 | Biber et al. | |
| 4,616,798 A | 10/1986 | Smeenge et al. | |
| 4,687,167 A | 8/1987 | Skalka et al. | |
| 4,695,024 A | 9/1987 | Haven | |
| 4,706,919 A | 11/1987 | Soberalski et al. | |
| 4,708,312 A | 11/1987 | Rohr | |

(Continued)

FOREIGN PATENT DOCUMENTS

JP 10-254581 9/1998

(Continued)

OTHER PUBLICATIONS

Global Manufacturing Products sold under the name "Shuttle Plus" (pictures).

(Continued)

*Primary Examiner*—Anita M. King
(74) *Attorney, Agent, or Firm*—Lerner, David, Littenberg, Krumholz & Mentlik, LLP

(57) ABSTRACT

A channel for an adjustable extension arm for mounting an electronic device. The channel includes a U-shaped body having first and second spaced apart ends, including a pair of spaced apart sidewalls and a bottom wall. A rib assembly is provided within the body between the sidewalls overlying the bottom wall.

36 Claims, 24 Drawing Sheets

U.S. PATENT DOCUMENTS

| | | | |
|---|---|---|---|
| 4,768,744 A | | 9/1988 | Leeds et al. |
| 4,770,384 A | | 9/1988 | Kuwazima et al. |
| 4,783,036 A | | 11/1988 | Vossoughi |
| 4,821,159 A | | 4/1989 | Pike |
| 4,844,387 A | | 7/1989 | Sorgi et al. |
| 4,852,500 A | | 8/1989 | Ryburg et al. |
| 4,852,842 A | | 8/1989 | O'Neill |
| 5,123,621 A | | 6/1992 | Gates |
| 5,174,531 A | | 12/1992 | Perakis |
| 5,190,803 A | * | 3/1993 | Goldbach et al. ............ 428/138 |
| 5,348,260 A | | 9/1994 | Acevedo |
| 5,379,205 A | | 1/1995 | Peng |
| 5,390,685 A | | 2/1995 | McCoy |
| 5,437,427 A | | 8/1995 | Johnson |
| 5,584,596 A | | 12/1996 | Greene |
| 5,642,819 A | | 7/1997 | Ronia |
| 5,664,750 A | | 9/1997 | Cohen |
| 5,743,503 A | | 4/1998 | Voeller et al. |
| 5,876,008 A | | 3/1999 | Sweere et al. |
| 6,012,693 A | | 1/2000 | Voeller et al. |
| 6,076,785 A | | 6/2000 | Oddsen, Jr. |
| 6,095,468 A | | 8/2000 | Chirico et al. |
| 6,174,585 B1 | * | 1/2001 | Miles ......................... 428/122 |
| 6,179,263 B1 | | 1/2001 | Rosen et al. |
| 6,398,259 B1 | * | 6/2002 | Palmer et al. ............... 280/777 |
| 6,421,979 B1 | * | 7/2002 | Fischer et al. ........... 52/745.19 |
| 6,478,274 B1 | | 11/2002 | Oddsen, Jr. |
| 6,540,855 B1 | * | 4/2003 | Holmberg .................... 156/69 |
| 6,799,780 B1 | * | 10/2004 | Anspaugh et al. .......... 280/777 |
| 6,908,132 B1 | * | 6/2005 | Bauhof ...................... 296/1.01 |

FOREIGN PATENT DOCUMENTS

| | | |
|---|---|---|
| JP | 11-085315 | 3/1999 |

OTHER PUBLICATIONS

Lesco Model L310.

* cited by examiner

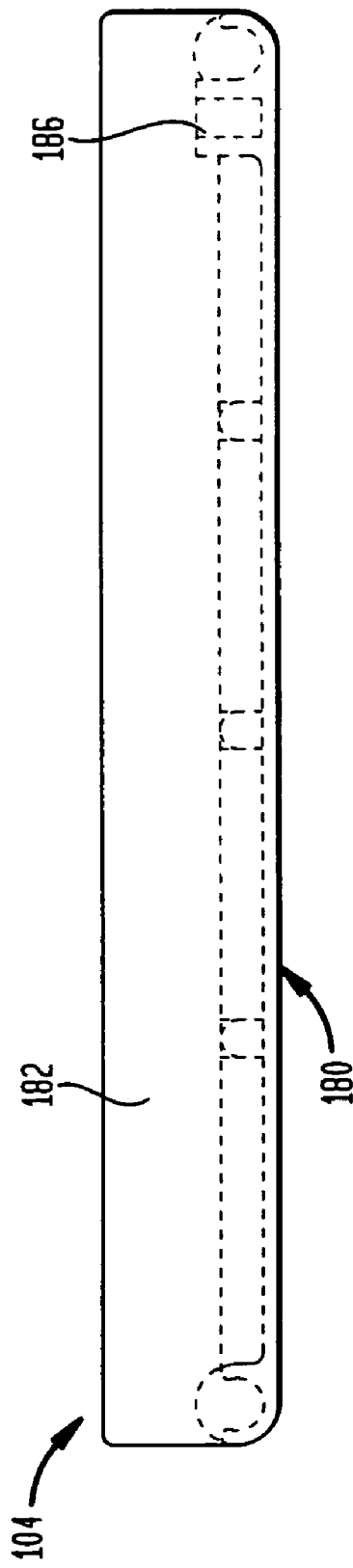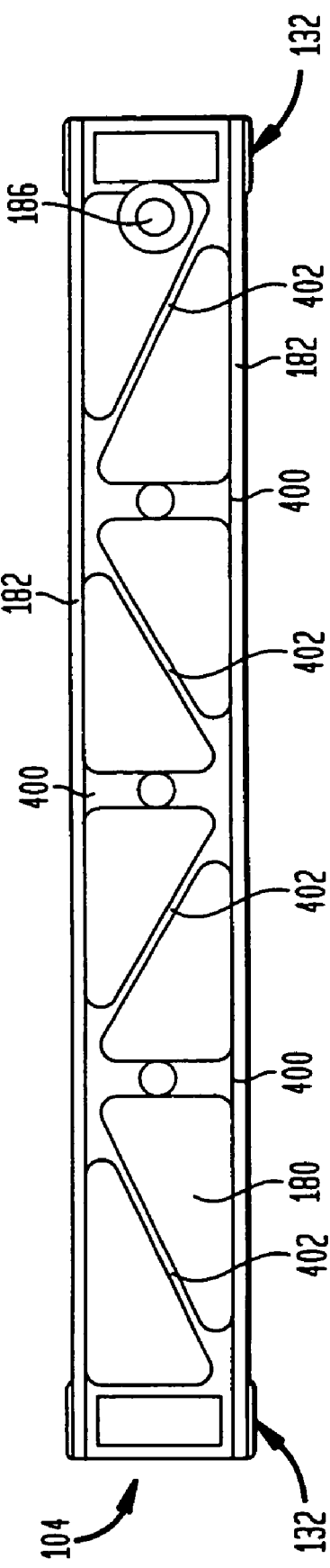

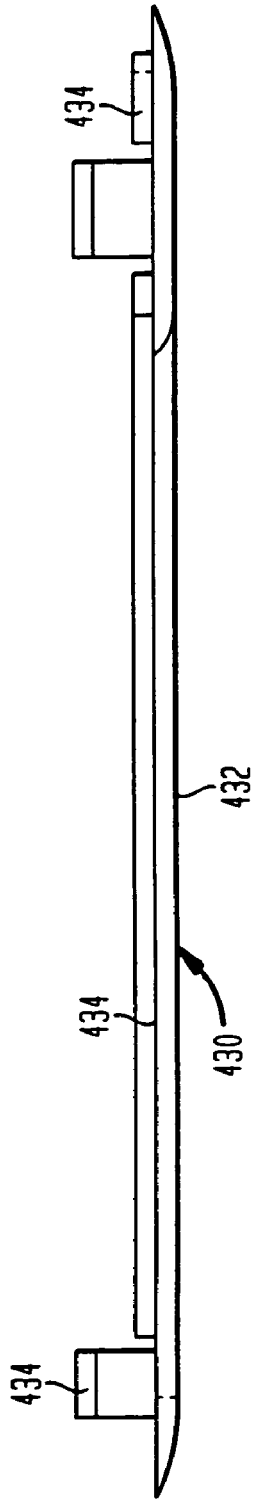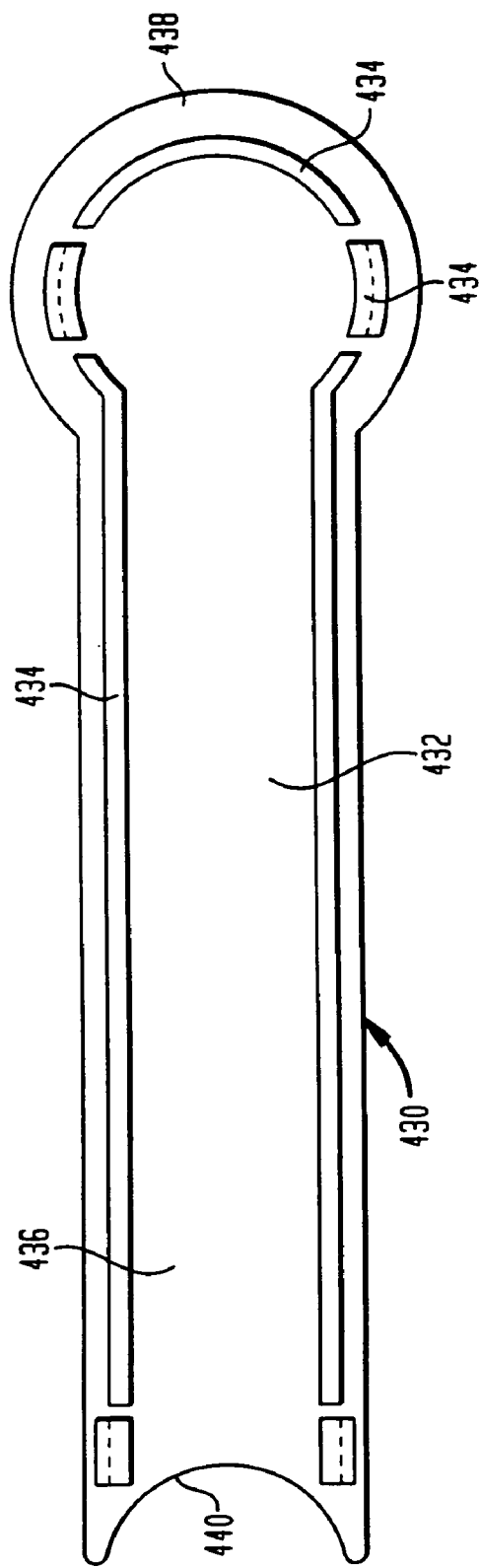

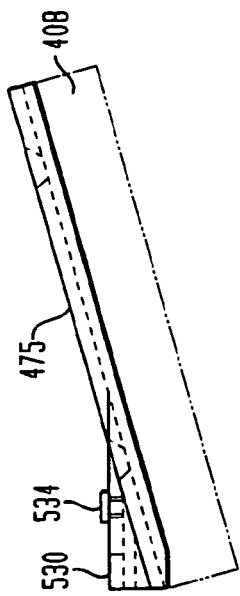
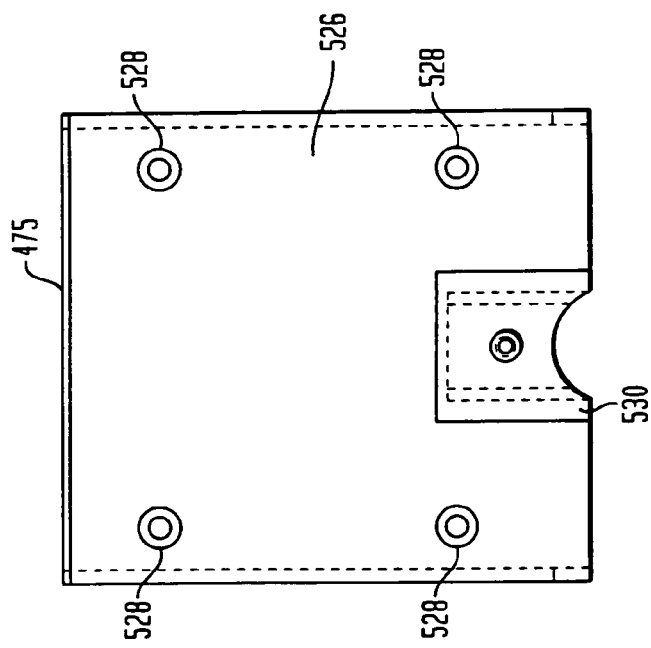
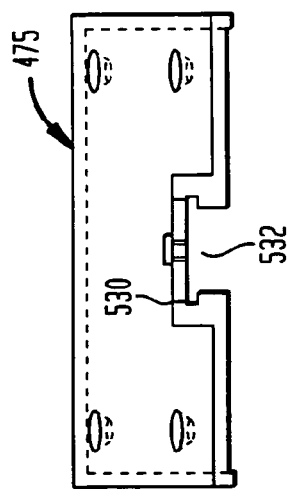

ARM APPARATUS FOR MOUNTING ELECTRONIC DEVICES WITH CABLE MANAGEMENT SYSTEM

CROSS-REFERENCE TO RELATED APPLICATIONS

The present application is a divisional application of U.S. application Ser. No. 10/448,769, filed May 30, 2003, which is a divisional application of U.S. application Ser. No. 09/776,355, filed Feb. 2, 2001, now U.S. Pat. No. 6,609,691, which is a continuation-in-part of U.S. patent application Ser. No. 09/406,006 filed Sep. 24, 1999, now U.S. Pat. No. 6,409,134 which claims the benefit of U.S. Provisional Application No. 60/138,120 filed on Jun. 7, 1999; and U.S. Provisional Application No. 60/191,266 filed on Mar. 22, 2000, the disclosures of which are incorporated herein by reference.

BACKGROUND OF THE INVENTION

The present invention relates in general to an arm apparatus for mounting electronic devices, and more specifically, to an extension arm having a system for internally managing the cables to and from the electronic device.

Adjustable extension arms for mounting electronic peripheral devices, such as computer monitors, notebook computers, Internet computers, VCR's, cameras, computer keyboards, televisions, other electronic devices and the like, are well known in the prior art. For example, there is known from O'Neill, U.S. Pat. No. 4,852,842; Greene, U.S. Pat. No. 5,584,596; and Voeller, et al., U.S. Pat. No. 5,743,503 various mechanical support arms. By way of one example, due to recent advances in flat-screen technology, there is a demand for adjustable extension arms that are particularly suited for use with flat-screen devices, such as flat-screen computer monitors and televisions.

To this end, FIGS. 1–7 disclose an extension arm 10 for mounting a peripheral device in accordance with the prior art. As shown in FIG. 1, the main elements of the extension arm 10 are a first endcap 12, an upper channel 14, a lower channel 16, a second endcap 18, and a forearm extension 20. The first endcap 12 has an endcap shaft 22 that is pivotably attachable to a rigid support mount (not shown), such as an orifice sized to accept the endcap shaft 22 or a track configured and sized to engage the grooves on endcap shaft 22. The first endcap 12 is pivotably coupled via pins 24 to both the upper channel 14 and the lower channel 16. The opposite ends of the upper channel 14 and the lower channel 16 are pivotably coupled via pins 24 to the second endcap 18. The second endcap 18 is coupled to the forearm extension 20 via a forearm extension pin 92. The forearm extension 20 has a vertically disposed hole 26 therethrough for accepting a device mount (not shown) such as a tilter, platform or other apparatus.

The combination of the upper and the lower channels 14, 1.6 and the first and the second endcaps 12, 18 form an adjustable parallelogram that permits a device coupled to the forearm extension 20 to be raised and lowered to a desirable height. The parallelogram retains its position by employing a gas spring 28, which is pivotably and adjustably attached to the first endcap 12 and the upper channel 14, as will be further described below. Generally, the gas spring 28, e.g., a gas type hydraulic cylinder and a retractable piston rod, is sized so as to have a fixed length until an upward or downward force is exerted at the second endcap 18 that exceeds the gas spring's designed resistance. Thus, the gas spring 28 causes the parallelogram to retain its position when the only force exerted at the second endcap 18 is the weight of the device, but permits the parallelogram to be adjusted when a user pushes the device coupled to the forearm extension 20 up or down.

FIG. 2 illustrates a side view of the first endcap 12, having the endcap shaft 22 disposed on a first end 30 of the first endcap 12. To provide a rigid connection between the two pieces, the endcap shaft 22 is typically machined from steel and is inserted into the first end 30 during the casting process of the first endcap 12. The endcap shaft 22 has a hole 32 formed in an end of the endcap shaft 22 that is inserted into the first endcap 12. The first endcap 12 is typically fabricated from cast aluminum. The first endcap 12 also has a second end 34 having a hole 36 disposed therethrough. Disposed within the first endcap 12 is a threaded rod 38. A first end 40 of the threaded rod 38 is inserted into the hole 32 at the base of the endcap shaft 22. A second end 42 of the threaded rod 38 is aligned with the hole 36 and is held in place by a clip 44. The clip 44 is fastened to an inner surface of the first endcap 12 by screws 46.

Threadedly mounted on the threaded rod 38 is a clevis 48. FIG. 3 illustrates a sideview of the clevis 48 including a tapped hole 50 in the center thereof. The tapped hole 50 receives the threaded rod 38, as shown in FIG. 2. At a first end of the clevis 48 is a pair of fastening members 52, 54 to which are fastened one end of the gas spring 28. A second end 56 of the clevis 48 is configured to slidably engage a track 58 which is integrally molded in the first endcap 12 (see FIG. 2). The second end 42 of the threaded rod 38 is configured to be engaged by a hex-shaped key which is inserted through the hole 36 when the second end 42 is properly aligned with the hole 36. The hex-shaped key is employed so as to rotate the threaded rod 38 along its axis of rotation. When the threaded rod 38 is rotated along its axis of rotation, the clevis 48 moves along the length of the threaded rod 38 in a direction that corresponds to the direction which the hex-shaped key is turned. This movement of the clevis 48 permits the gas spring 28 to be adjusted.

FIGS. 4(a) and 4(b) illustrate the upper channel 14, which comprises channel bottom 60 from which extend two channel sidewalls 62. Channel bottom 60 and sidewalls 62 are typically stamped from 13 gauge steel sheet in order to give the upper channel 14 a desired degree of structural rigidity. At each of the ends of the channel bottom 60, a semi-circular region 64 of the sidewalls 62 is cut out to accommodate cold-rolled steel rollers 66, which have a hole 68 therethrough for receiving the pins 24. The rollers 66 are rigidly attached to the upper channel 14 by MIG welding along the edge of the semi-circular cut out region 64 and along the ends of the channel bottom 60.

Additionally, the upper channel 14 comprises stiffener 70, which is welded to an inner surface of the channel bottom 60. Besides providing additional structural rigidity to the upper channel 14, the stiffener 70 has a hole disposed at one end with a threaded ball stud 72 placed within the hole and fixed in place by a nut 74. The ball stud 72 is configured and sized to receive one end of the gas spring 28. The longitudinal centerline 76 of the upper channel 14 is illustrated in FIG. 4(b).

FIGS. 5(a) and 5(b) illustrate the lower channel 16 which comprises a channel bottom 78 from which extend two channel sidewalls 80. As with the upper channel 14, the channel bottom 78 and sidewalls 80 are typically stamped from 13 gauge steel sheet, which is relatively heavy in order to give the lower channel 16 a desired degree of structural rigidity. At opposite ends of the channel bottom 78, a semi-circular region 82 of the sidewalls 80 is cut out to accommodate cold-rolled steel rollers 84, which have a hole 86 therethrough for receiving the pins 24. The rollers 84 are rigidly attached to the lower channel 16 by MIG welding along the edge of the semi-circular cut out region 82 and along the ends of the channel bottom 78. The longitudinal centerline 88 of the lower channel 16 is illustrated on FIG. 5(b).

FIG. 6 illustrates the second endcap 18. Unlike the first endcap 12, the second endcap 18 does not have an endcap shaft, nor does it have a clevis assembly for attachment to the gas spring 28. Instead, the second endcap 18 has a hole 90 disposed in a bottom end for receiving the forearm extension pin 92, and a hole 94 in a side for inserting a pin 96 into the forearm extension pin 92, as illustrated in FIG. 1.

FIG. 7 illustrates the forearm extension 20 having the forearm extension pin 92 welded thereto. The forearm extension pin 92 has a hole 98 formed in an upper end to receive the pin 96. The forearm extension 20 is configured to be pivoted around the forearm extension pin 92, and is held in place within the second endcap 18 by the pin 96 which penetrates the hole 94 of the second endcap 18 and the hole 98 of the forearm extension pin 92.

Extension arms 10 of the prior art, such as the one shown in FIGS. 1–7 and others like it, are ill-suited, for example, for flat-screen monitors and televisions, in that they are bulky and cumbersome. Moreover, due to the configuration of its various parts, extension arms 10 of the prior art cannot be flattened against a mounting surface so that the entire extension arm 10 is hidden behind the electronic device when the device is substantially flush with the mounting surface. Furthermore, the extension arms 10 of the prior art are not designed so as to enable the cables to and from a device to be substantially hidden, and thus protected, within the extension arm 10 itself. Additionally, the extension arms 10 of the prior art are generally costly to manufacture and difficult to assemble.

Thus, there is a continued need for an extension arm suitable to mount an electronic device that enables the cables to and from the electronic device to be substantially hidden from view within the extension arm and thus protected from the elements.

SUMMARY OF THE INVENTION

The present invention, in accordance with one embodiment, relates to an extension arm suitable for mounting an electronic device, such as a computer monitor, notebook computers, Internet computers, VCR's, cameras, computer keyboards, televisions, other electronic devices and the like.

In accordance with one embodiment of the present invention there is described an adjustable extension arm for mounting an electronic device thereto, the extension arm comprising a forearm extension having a first end and a second end for attachment of a device thereto, the forearm extension having a first opening at the first end and a second opening adjacent the second end, the first and second openings in communication with each other through a channel provided within the forearm extension between the first and second ends, a first endcap having a first end rotationally attached to the first end of the forearm extension, the first endcap having an opening extending therethrough in communication with the first opening within the forearm extension, a second endcap having a first end attachable to a support structure, and elongated first and second channel members nested together to form a channel therebetween, the first and second channel members having first ends pivotably attached to the first endcap and second ends pivotably attached to the second endcap.

In accordance with another embodiment of the present invention there is described an adjustable extension arm for mounting an electronic device thereto, the extension arm comprising a forearm extension having an internal elongated channel opening upward and extending between first and second ends of the forearm extension, a device mounting assembly for mounting an electronic device to the second end of the forearm extension, a first endcap having a first end to which the first end of the forearm extension is rotationally mounted, the first endcap including an opening extending therethrough in communication with the internal elongated channel within the forearm extension, a second endcap attachable to a support structure, a nested pair of elongated members forming an internal elongated channel therein, one common end of the elongated members pivotably attached to the first endcap and another common end of the elongated members pivotably attached to the second endcap, wherein the extension arm has a cable pathway through the opening extending through the first endcap and the internal elongated channel within the forearm extension.

In accordance with another embodiment of the present invention there is described an adjustable extension arm for mounting an electronic device thereto, the extension arm comprising a forearm extension having a first end and a second end for attachment of an electronic device thereto, the first end having a through hole connected to the second end by a U-shaped member having a bottom wall and a pair of spaced apart sidewalls, the U-shaped member forming an elongated first channel in communication with the through hole, a cover releasably attachable to the forearm extension overlying the through hole and a portion of the U-shaped member for enclosing the elongated first channel, at least one opening in the forearm extension in either the bottom wall adjacent the second end or between the second end and a portion of the cover; a first endcap including a first end and a second end having a through hole extending between the first and second ends; a tubular member received within the through hole within the first endcap having an interior in communication with the first channel within the forearm extension, the tubular member having a sidewall provided with a cutout, the forearm extension rotatably attached to the first endcap by the tubular member being received within the through hole within the first end of the forearm extension; a second endcap having an end rotatably attachable to a support structure; and elongated first and second channel members nested together to form a channel therebetween, the first and second channel members having first ends pivotably attached to the first endcap and second ends pivotably attached to the second endcap, one of the channel members having an elongated opening between the first and second ends providing communication between the exterior of the channel member and the channel formed therein, wherein the extension arm forms a cable pathway extending through the through hole within the tubular member and the first channel within the forearm extension.

BRIEF DESCRIPTION OF THE DRAWINGS

The above description, as well as further objects, features and advantages of the present invention will be more fully understood with reference to the following detailed description of an arm apparatus for mounting electronic devices with cable management system, when taken in conjunction with the accompanying drawings, wherein:

FIGS. 18a–b are a side and bottom view, respectively, of an upper channel according to one embodiment of the invention;

FIG. 26 illustrates one view of a forearm extension cover member in accordance with one embodiment of the invention;

FIG. 27 illustrates another view of the forearm extension cover member according to the invention;

FIGS. 45–47 are various illustrations of a mounting bracket for the tilter shown in FIG. 34 according to one embodiment of the invention.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

With reference to the drawings, in general, and FIGS. 8 through 17 in particular, the apparatus of the present invention is disclosed. Embodiments of an extension arm suitable for mounting a flat-screen electronic peripheral device, such as a computer monitor or television, that is inexpensive and easy to manufacture and assemble, and permits a flat-screen device to be mounted substantially flush with a mounting surface is described in U.S. patent application Ser. No. 09/405,628 filed Sep. 24, 1999 entitled "Arm Apparatus For Mounting Electronic Devices", the disclosure of which is incorporated herein in its entirety. The current invention discloses embodiments that enable the extension arm to substantially hide from view the cables to and from the flat-screen electronic peripheral device within the extension arm.

Figure 1:
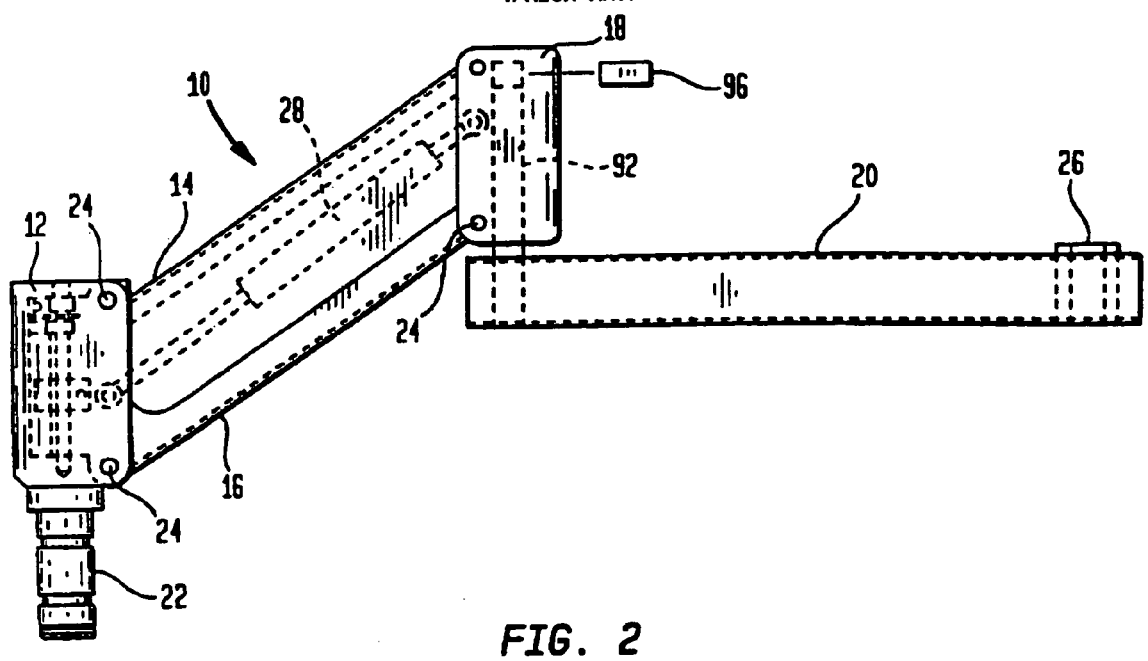
FIG. 1 is an assembly drawing of an extension arm for mounting a computer monitor, in accordance with the prior art.
Figure 2:
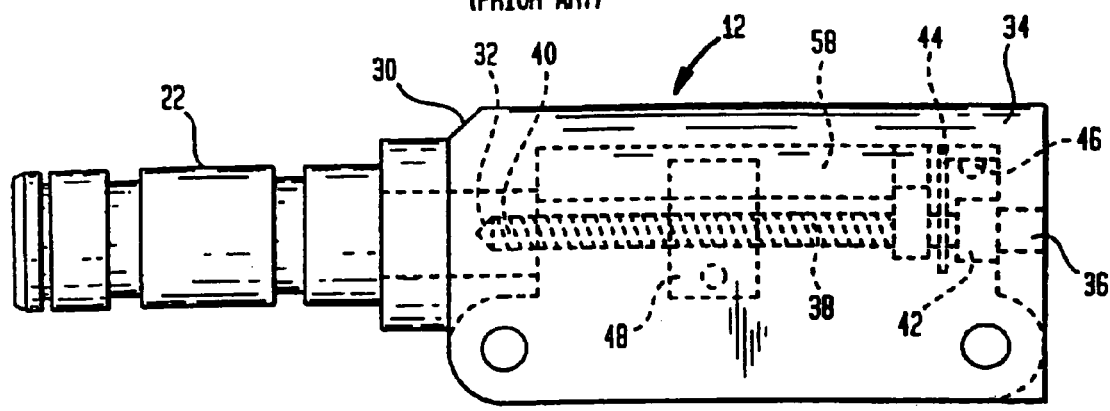
FIG. 2 illustrates a first endcap of an extension arm, in accordance with the prior art.
Figure 3:
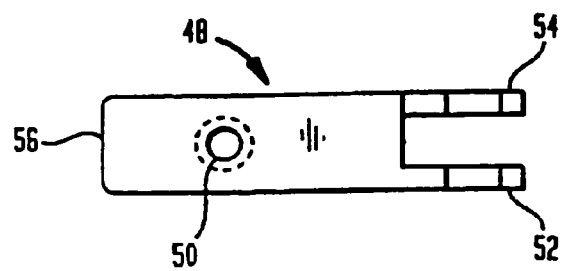
FIG. 3 illustrates the clevis assembly of an extension arm, in accordance with the prior art.
Figure 4A:
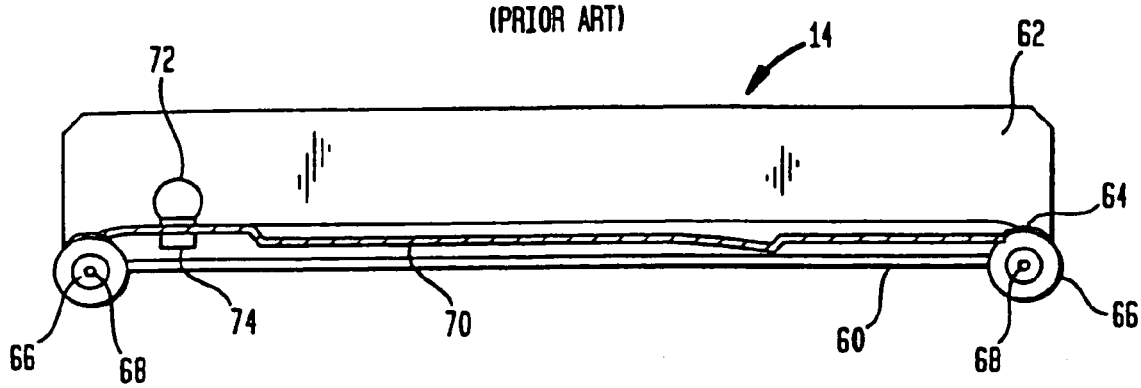
FIGS. 4a and 4b illustrate the upper channel of an extension arm, in accordance with the prior art.
Figure 4B:
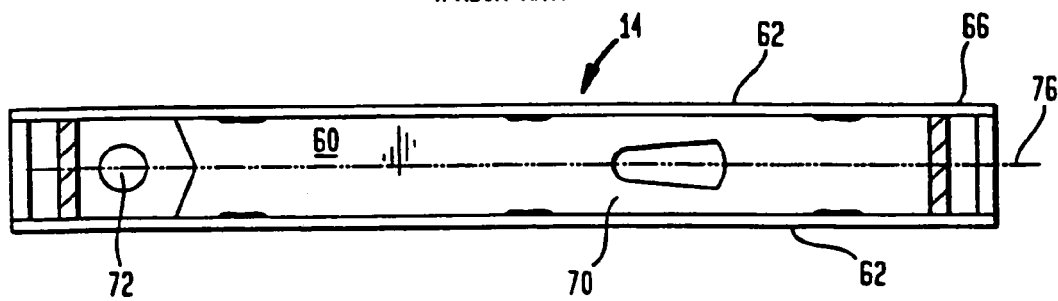
Figure 5A:
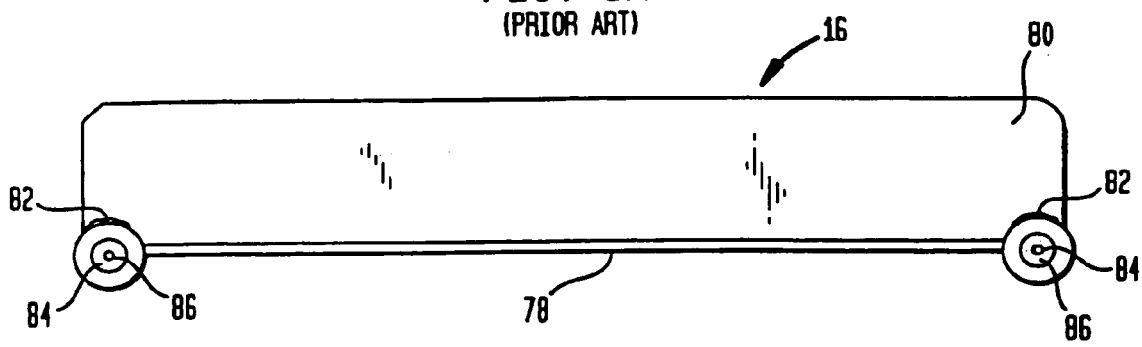
FIGS. 5a and 5b illustrate the lower channel of an extension arm, in accordance with the prior art.
Figure 5B:
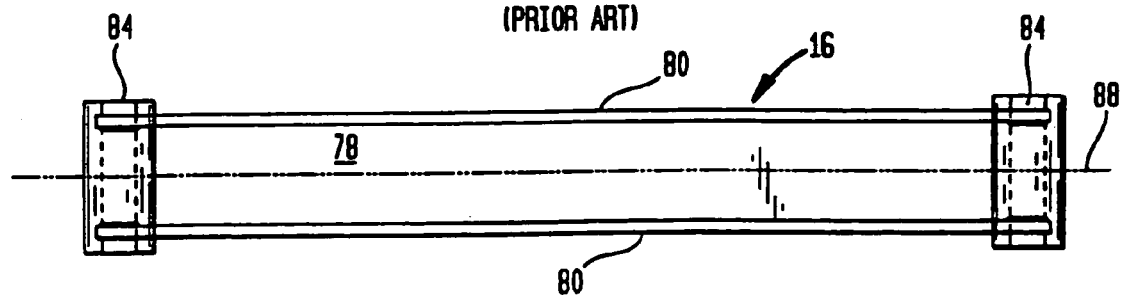
Figure 6:
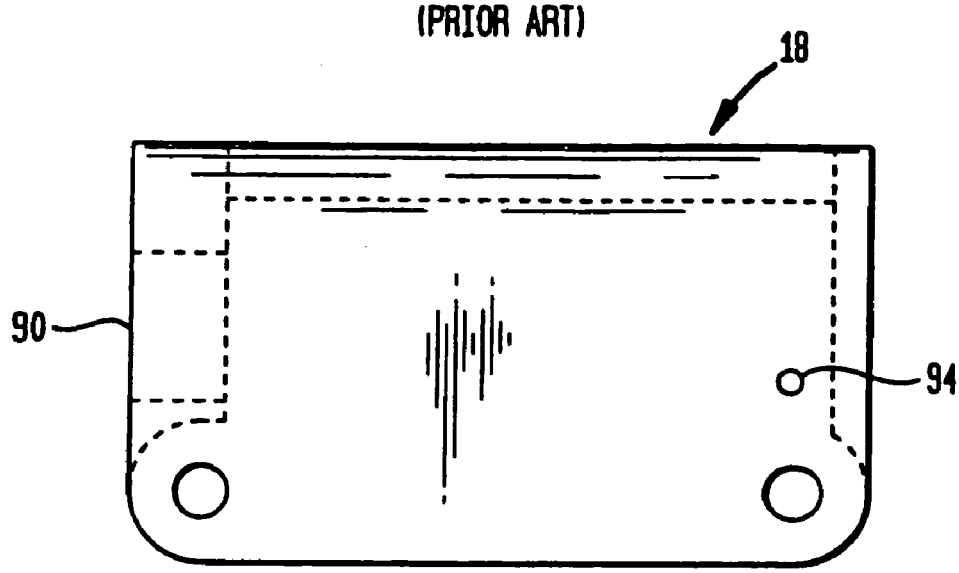
FIG. 6 illustrates a second endcap of an extension arm, in accordance with the prior art.
Figure 7:
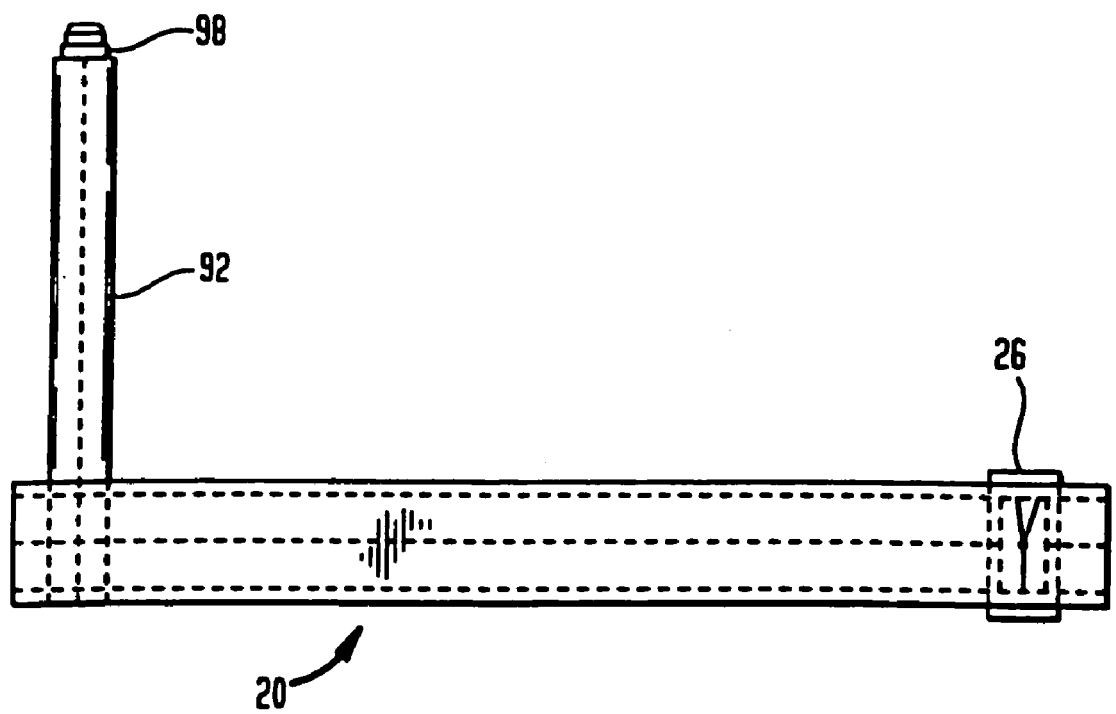
FIG. 7 illustrates a forearm extension of an extension arm, in accordance with the prior art.
Figure 8:
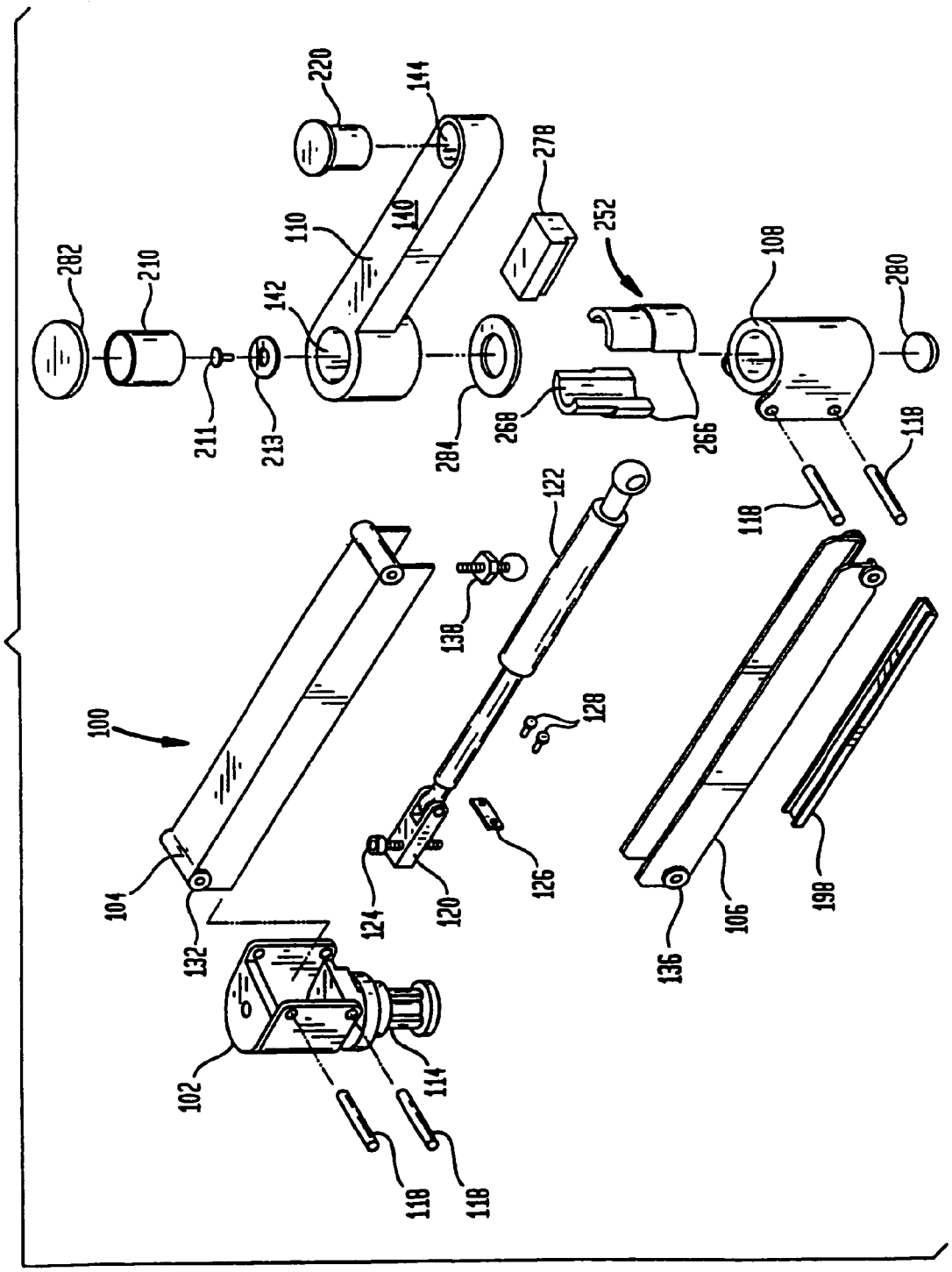
FIG. 8 is an exploded assembly drawing of an extension arm having an interior cable management system for adjustably mounting a flat-screen device to a support mount, according to one embodiment of the invention.
Figure 9:
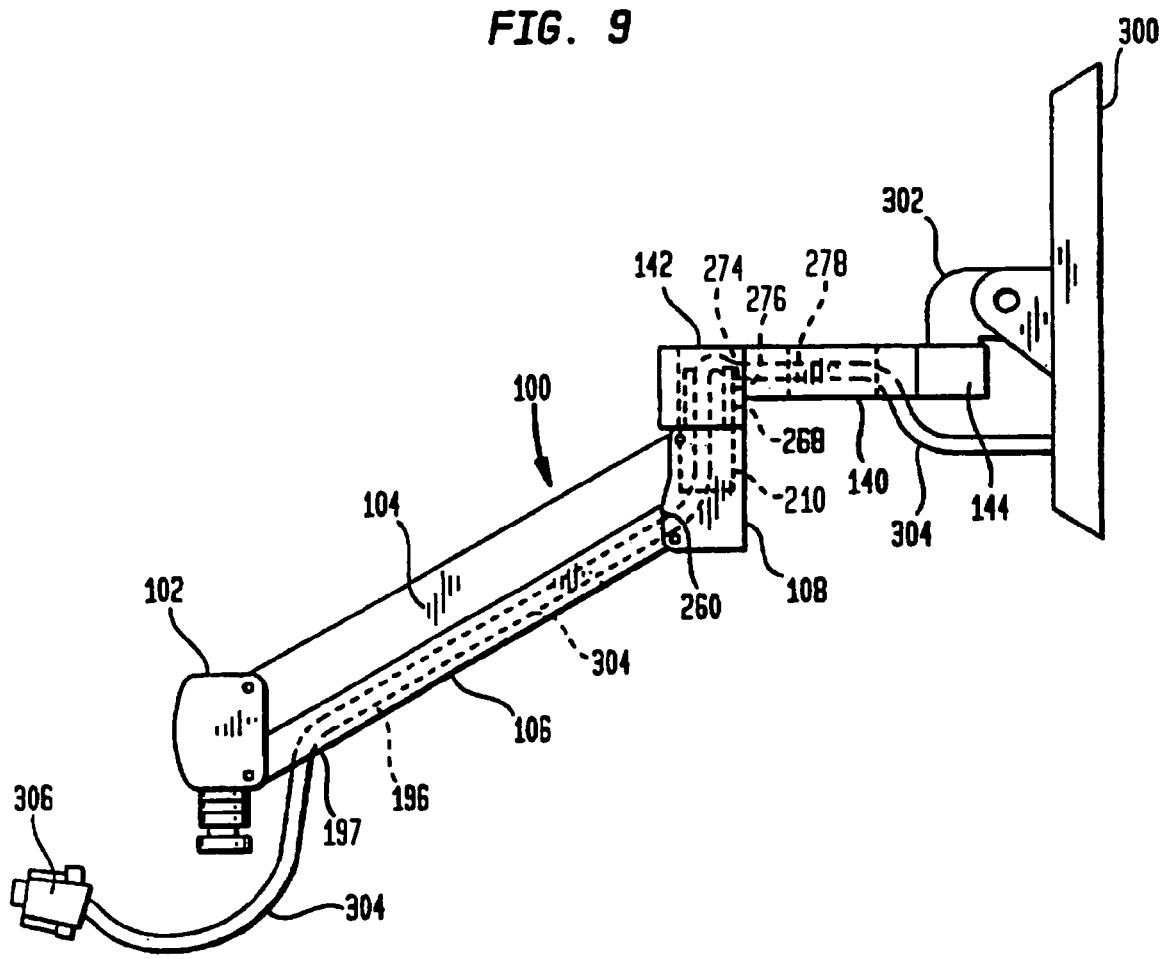
FIG. 9 is a side view of an extension arm with an interior cable management system.

FIG. 8 is an exploded assembly drawing of an extension arm 100 in accordance with one embodiment. The extension arm 100 comprises a first endcap 102, an upper channel 104, a lower channel 106, a second endcap 108, and a forearm extension 110. FIG. 9 illustrates how cables to and from the device are disposed within the lower channel 106, the second endcap 108, and the forearm extension 110 of the extension arm 100 so as to be hidden from view. FIG. 9 will be discussed in more detail later.

Figure 10A:
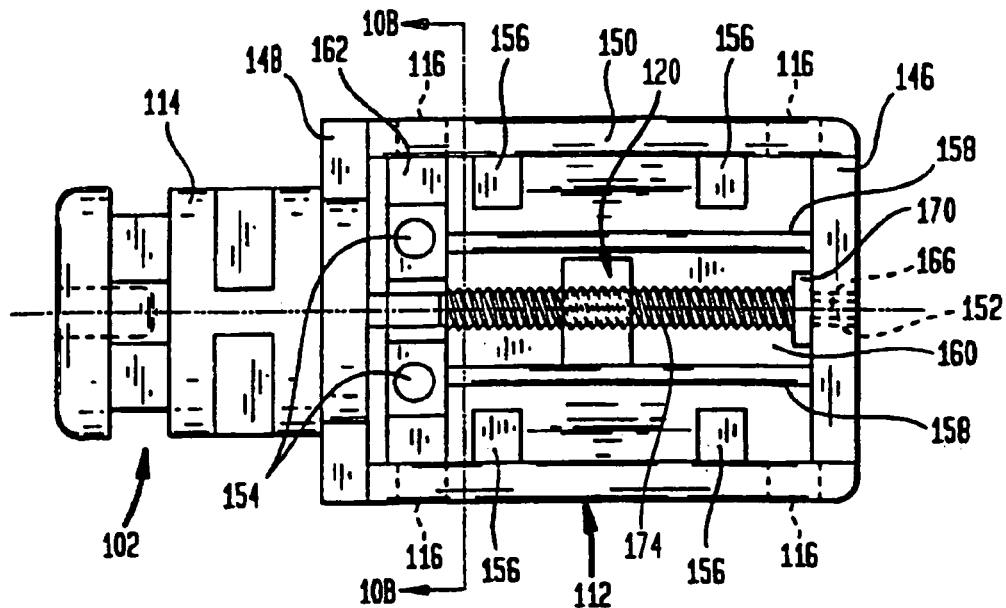
FIGS. 10a–d illustrate several views of a first endcap, in accordance with one embodiment of the invention.
Figure 10B:
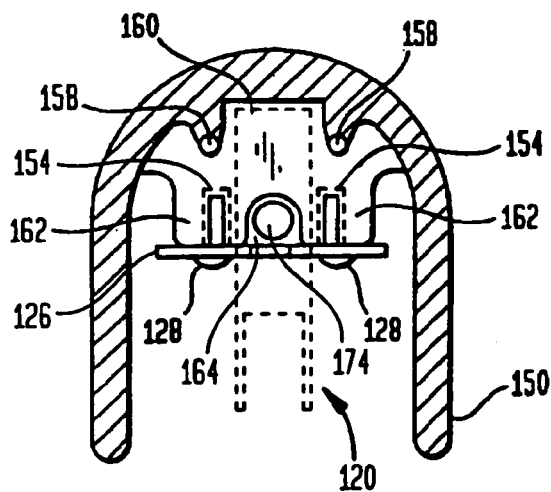

FIGS. 10a and 10b illustrate the first endcap 102, in accordance with one embodiment of the invention. In the embodiment shown, the first endcap 102 includes a partially enclosed housing 112 which has flat, oppositely disposed endwalls 146 and 148 fixedly connected by a sidewall 150. The sidewall 150 extends partially around the partially enclosed housing 112 so as to permit manipulation of components to be assembled within the first endcap 102. In one embodiment, the endwalls 146 and 148 are semicircular in shape and are connected along a semicircular edge to the sidewall 150, which extends perpendicularly therebetween.

FIG. 10a illustrates the first endcap 102 having a shaft 114 disposed on the endwall 148. The shaft 114 is preferably integrally molded to the endwall 148 of the first endcap 102. Preferably the entire first endcap 102 (the partially enclosed housing 112 and the shaft 114) is molded from zinc. The endwall 146 has a hole 152 disposed therethrough. Within the partially enclosed housing 112 and integrally molded on the sidewall 150 are stops 156 disposed in proximity to the endwalls 146, 148; trough walls 158 disposed longitudinally along the inner surface of the sidewall 150 between the endwalls 146 and 148 so as to define a trough 160 therebetween; and shelves 162 disposed adjacent to the endwall 148.

The stops 156 serve to stop upward or downward movement of the extension arm 100 when ends of the upper channel 104 and the lower channel 106, respectively, meet the stops 156 when the extension arm 100 is in extended positions. The trough 160 disposed between the trough walls 158 allows a clevis 120 to be moved therein, as discussed in more detail later. FIG. 10b illustrates the shelves 162 defining coplanar faces separated by a groove 164. The shelves 162 have a connection means, such as self tapping screw holes 154 disposed therein. The coplanar faces of the shelves 162 are configured to engage a retainer clip 126, which is fastened in place by, for example, a pair of screws 128. When the retainer clip 126 is fastened in place, the groove 164 defines a spacing for accepting one end of a threaded rod 124, as discussed in more detail below.

Figure 10C:
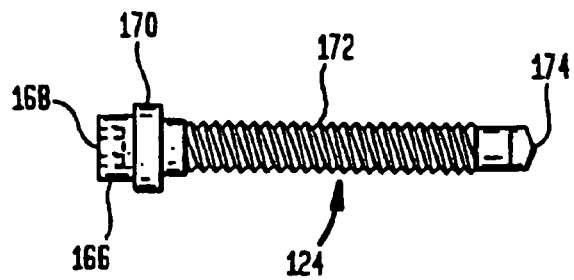

The threaded rod 124 and the clevis 120 are now fabricated and assembled in the first endcap 102. The threaded rod 124 is employed within the first endcap 102 so as to adjustably support the clevis 120. FIG. 10c illustrates the threaded rod 124 having a first end 166 which has a circular cross-section within which is axially disposed a shaped opening 168, for example a hex-shaped opening, for accepting a shaped key (not shown), such as a hex-shaped key. Advantageously, a cross-sectional diameter of the first end 166 is smaller than a cross-sectional diameter of the hole 152, so as to be inserted therein. Adjacent the first end 166 is a shoulder 170. Advantageously, the shoulder 170 has a circular cross-section having a diameter that is larger than the cross-sectional diameter of the hole 152. Thus, in a preferred embodiment, the shoulder 170 abuts an inner surface of the endwall 146 and retains the first end 166 within the hole 152.

The threaded rod 124 also includes a threaded section 172 which is configured to threadingly engage the clevis 120. A second end 174 of threaded rod 124 is disposed in the groove 164 located between the shelves 162 of the first endcap 102. Preferably, the second end 174 of the threaded rod 124 has a circular cross-section having a diameter that is smaller than the size of the groove 164, such that the second end 174 is supported between the shelves 162 but is free to rotate therein.

Figure 10D:
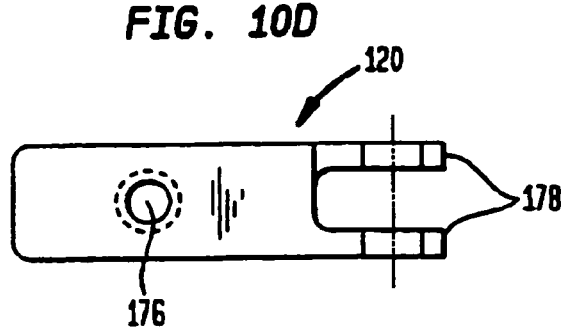

As previously mentioned, threadedly mounted on the rod 124 is the clevis 120. The clevis 120 as illustrated in FIG. 10d, has a tapped hole 176 formed therein for receiving the threaded rod 124. The clevis 120 also has a pair of fastening members 178 at a first end to which are fastened a first end of a gas spring 122. The second end of the clevis 120 is configured to slidably engage the trough 160.

When the first end 166 of the threaded rod 124 is engaged by a shaped key, the shaped key is employed so as to rotate the threaded rod 124 around its axial centerline. When the threaded rod 124 is rotated around this axis of rotation, the clevis 120 moves along the length of the threaded rod 124 in a direction that corresponds to the direction which the shaped key is turned. This movement of the clevis 120 permits the gas spring 122 to be adjusted.

The partially enclosed housing 112 is configured with, for example, holes 116 to receive a connection mechanism, such as pins 118, therethrough. The shaft 114 is configured to be inserted for pivotable rotation in a support mount (not shown), which may be a wall, desk or pole mount, or a configurable mount as shown and described in Applicant's co-pending U.S. patent application Ser. No. 09/406,531 entitled "Configurable Mount" filed on Sep. 27, 1999, the disclosure of which is incorporated herein by reference in its entirety.

FIGS. 11a–d illustrate several views of the upper channel 104, according to one embodiment of the invention. The upper channel 104 includes a U-shaped body 130 and integrally cast rollers 132 disposed at opposite ends of the U-shaped body 130. The U-shaped body 130 comprises a channel bottom 180 from which extend two channel sidewalls 182. The channel bottom 180, the sidewalls 182 and the rollers 132 of the upper channel 104 are preferably integrally cast from zinc, which gives the upper channel 104 a lesser weight, and a degree of structural rigidity, more suitable for lighter-weight flat-screen devices than the prior art upper channel 14 which is stamped from heavy gauge steel. The rollers 132 have a hole 184 therethrough (either cast or subsequently drilled) for receiving a connection mechanism, such as the pins 118. Additionally, the upper channel 104 comprises a threaded hole 186 configured and sized to receive a threaded end of a ball stud 138. The threaded hole 186 is also integrally cast. The ball stud 138 is configured and sized to receive a second end of the gas spring 122.

Figure 11A:
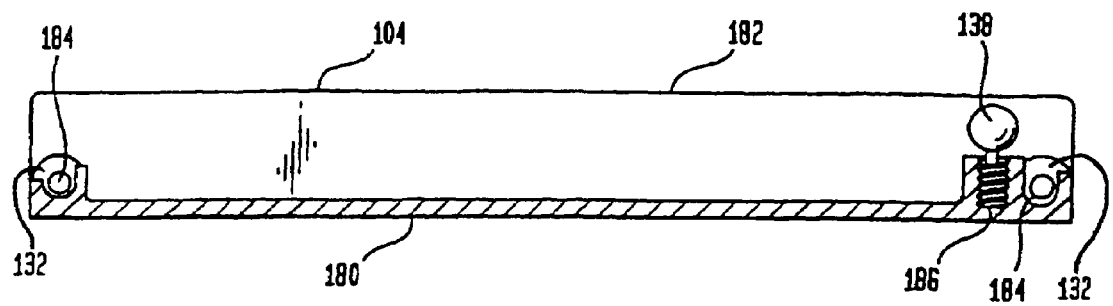
FIGS. 11a–d illustrate a side view, bottom view, and two cross-section views, respectively, of an upper channel, according to one embodiment of the invention.
Figure 11B:
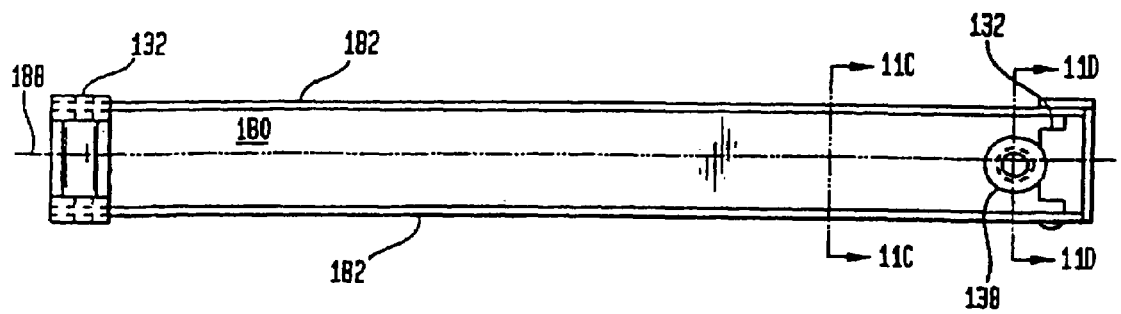
Figure 11C:
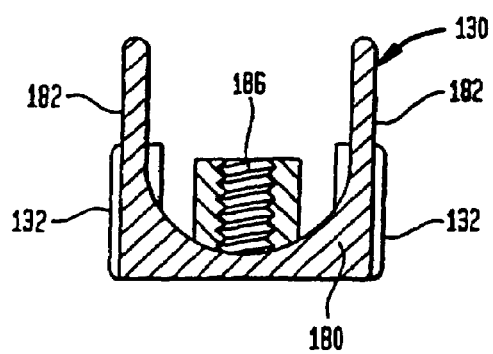
Figure 11D:
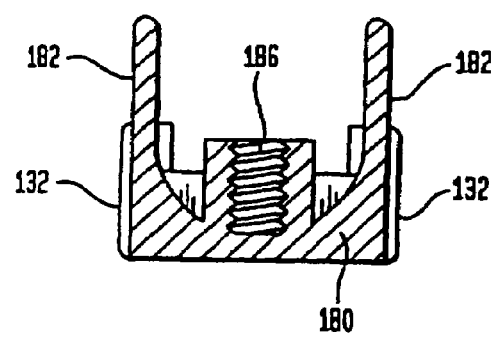

Unlike the prior art upper channel 14 in which the U-shaped channel is formed by heating a piece of steel and bending the steel to form the channel bottom 60 and the sidewalls 62, the upper channel 104 of the invention is cast molded. The use of cast molding ensures the angle between the channel bottom 180 and the sidewalls 182 is exactly the same each and every time. Moreover, cast molding enables the sidewalls 182 to be tapered. As illustrated in FIGS. 11c and 11d, both an outer surface and an inner surface of the sidewalls 182 may taper in, for example, by approximately 1 degree. It should be noted that the taper is not limited to 1 degree, and that the taper of the inner surface and the outer surface need not be the same. The taper provides several advantages including more clearance between the upper and the lower channels 104, 106 when the upper and the lower channels 104, 106 are brought together during usage. That is, the inner surface of the sidewalls 182 being displaced by 1 degree means that there will be additional clearance for the lower channel 106 to fit therewithin. The additional clearance will help prevent the upper channel 104 and the lower channel 106 from scraping together.

FIGS. 12a–e illustrate several views of the lower channel 106, according to one embodiment of the invention. The lower channel 106 includes a U-shaped body 134 and integrally cast rollers 136 disposed at opposite ends of the U-shaped body 134. The U-shaped body 134 of the lower channel 106 comprises a channel bottom 190 from which extend two channel sidewalls 192. The channel bottom 190, the sidewalls 192 and the rollers 136 of the lower channel 106 are preferably integrally cast from zinc, which gives the lower channel 106 a lesser weight when compared to heavy gauge steel, and a degree of structural rigidity, more suitable for lighter-weight flat-screen devices. The rollers 136 have a hole 194 therethrough (either cast or subsequently drilled) for receiving a connection mechanism, such as the pins 118.

The channel bottom 190 additionally includes a cable channel 196 running longitudinally therealong. In the embodiment shown, a first end 197 of the cable channel 196 starts near an end of the channel bottom 190 that pivotably connects to the first endcap 102. The cable channel 196 then runs along the entire length of the channel bottom 190 to the end of the channel bottom 190 that pivotably connects to the second endcap 108. Thus, the second end 199, of the cable channel 196 is an opening between the roller 136 at the end of the channel bottom that pivotably connects to the second endcap 108. The first end 197 may be, for example, rounded to improve the rigidity of the lower channel 106. The cable channel 196 is configured to receive a cable cover 198 (illustrated in FIG. 12e) which is configured to removably fit within the cable channel 196. Thus, cables of the mounted device may be substantially retained within the lower channel 106 so as to hide them from view and protect them from harm. The cable channel 196 and the cable cover 198 enable cables to be accessed when desired, while securing them within the lower channel 106.

Figure 12A:
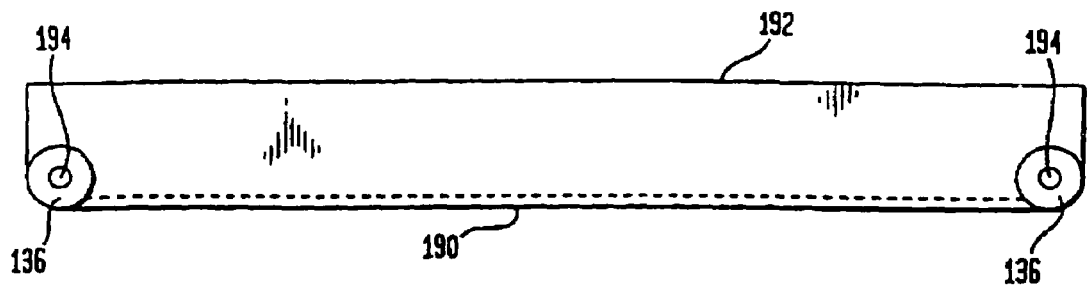
FIGS. 12a–e illustrate a side view, bottom view, and three cross-section views, respectively, of a lower channel, according to one embodiment of the invention.
Figure 12B:
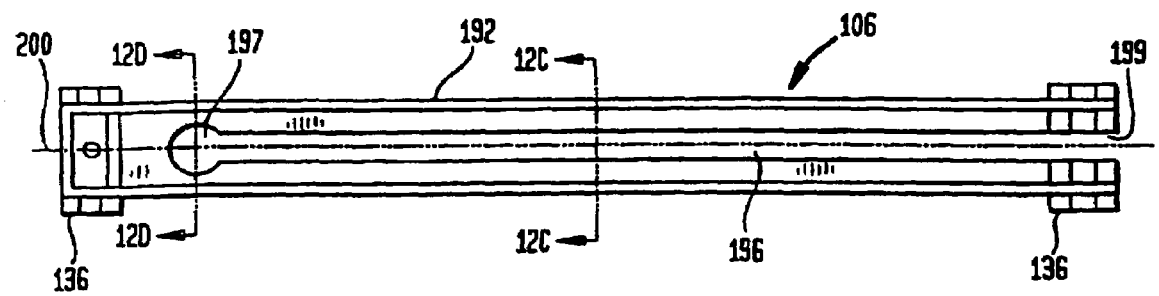
Figure 12C:
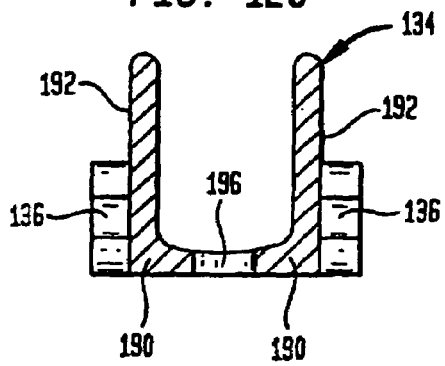
Figure 12D:
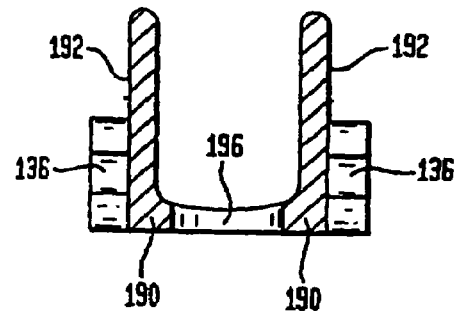

As illustrated in FIGS. 12c and 12d the sidewalls 192 of the lower channel 106 are tapered. For example, an outer surface of the sidewalls 192 may be tapered approximately 112 degree while an inner surface may be tapered approximately 1 degree. It should be noted that the taper is not limited to a particular angle, and that the taper of the inner surface and the outer surface may be the same. The taper is possible because the lower channel 106 is, in the preferred embodiment, cast molded. As noted above with respect to the upper channel 104, the taper provides more clearance between the upper channel 104 and the lower channel 106 so as to reduce or eliminate the chance of the upper and the lower channels 104, 106 scraping.

Figure 12E:
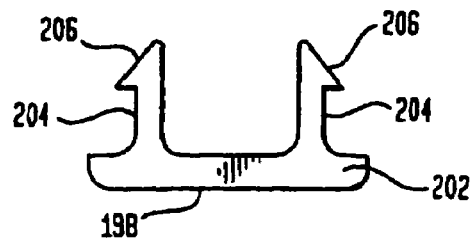

As illustrated in FIG. 12e, the cable cover 198 includes a top cover 202 with two sidewalls 204 protruding therefrom. A far end of each sidewall 204 has a catch 206 formed thereon so as to engage with the cable channel 196.

Figure 13A:
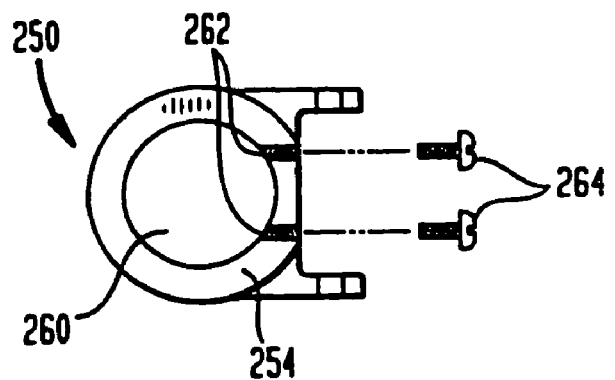
FIGS. 13a–c illustrate several views of a partially enclosed housing of a second endcap, according to one embodiment of the invention.
Figure 13B:
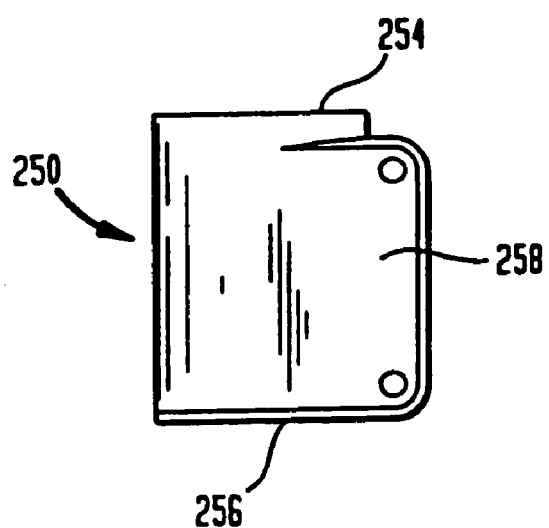
Figure 13C:
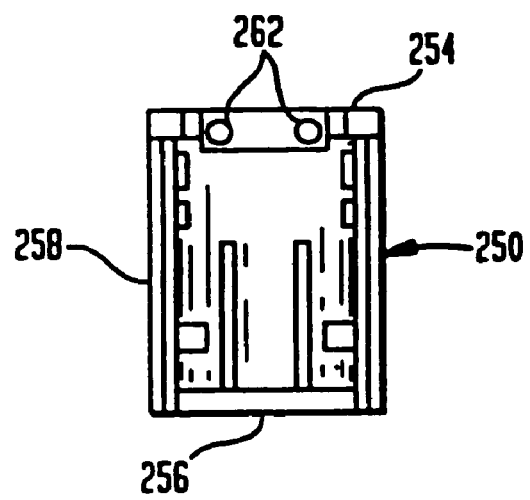

The second endcap 108 includes a partially enclosed housing 250 and a shaft assembly 252. As illustrated in FIGS. 13a–c, the partially enclosed housing 250 has a first endwall 254 and a second endwall 256 oppositely disposed from each other and fixedly connected by a sidewall 258. The sidewall 258 extends partially around the partially enclosed housing 250 so as to permit manipulation of components, such as cables, which may be contained therewithin. The first endwall 254 has a hole 260 disposed therethrough and threaded holes 262 disposed therein that are in communication with the hole 260. Disposed with the threaded holes 262 are set screws 264. Preferably, the diameter of the hole 260 is large enough to allow a plug end of a cable to fit therethrough.

Figure 14A:
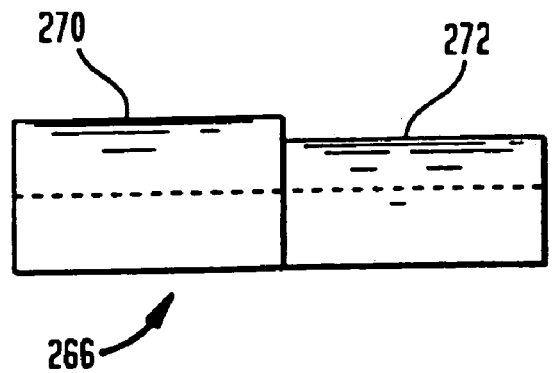
FIGS. 14a–c illustrates several views of a shaft assembly of a second endcap, according to one embodiment of the invention.
Figure 14B:
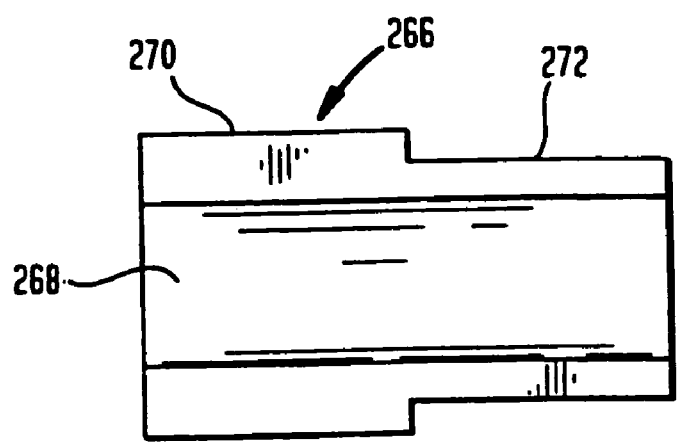
Figure 14C:
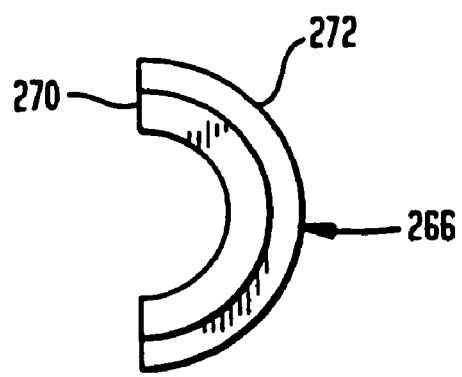
Figure 15:
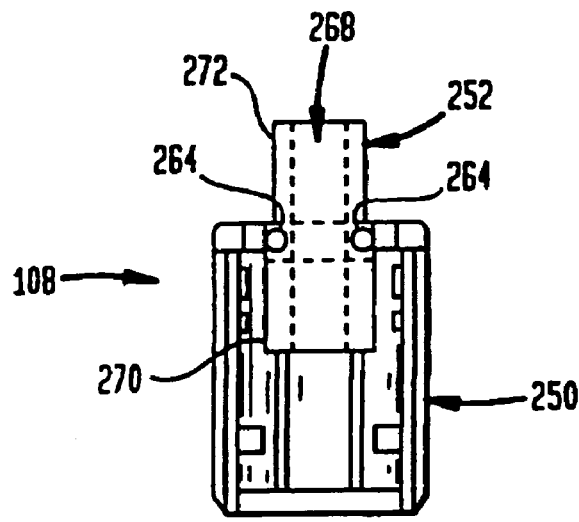
FIG. 15 illustrates an assembled second endcap according to one embodiment of the invention.

As illustrated in FIGS. 14a–c, the shaft assembly 252 preferably includes two symmetrical endcap adapters 266 which when assembled provide a hollow shaft 268. The endcap adapters 266 have a mounting end 270 and a shaft end 272 that is thinner than the mounting end 270. As illustrated in FIG. 15, the mounting end 270 of both of the endcap adapters 266 are inserted into the hole 260 and are coupled together and to the partially enclosed housing 250, to form the second endcap 108, by tightening the set screws 264.

The upper and the lower channels 104, 106 and the first and the second endcaps 102, 108 are configured so as to form an adjustable parallelogram. When configured, the shaft 114 of the first endcap 102 and the hollow shaft 268 of the second endcap 108 point in opposite directions. For example, as illustrated in FIG. 8, the shaft 114 of the first endcap 102 extends vertically downward while the hollow shaft 268 of the second endcap 108 extends vertically upward. The shape of the parallelogram is retained by the gas spring 122. As previously mentioned, the first end of the gas spring 122 is attached to the ball stud 138 mounted within the upper channel 104 and the second end is adjustably mounted to the clevis 120 within the first endcap 102.

Generally, the gas spring 122 is sized so as to have a fixed length until an upward or downward force is exerted at the second endcap 108 that exceeds the gas spring's designed resistance. Thus, the gas spring 122 retains the parallelogram shape when the only force exerted at the second endcap 108 is the weight of the flat-screen device. However, the gas spring 122 permits the parallelogram shape to be adjusted when a user pushes the flat-screen device coupled to the forearm extension 110 up or down.

Figure 16A:
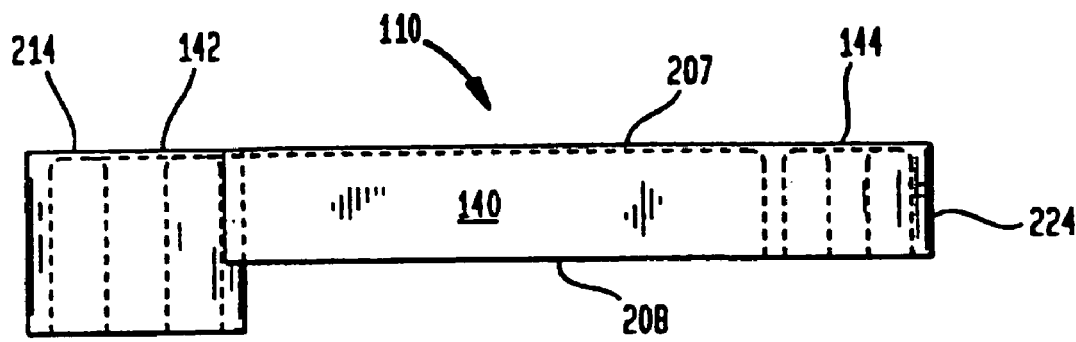
FIGS. 16a and 16b illustrate a forearm extension, in accordance with one embodiment of the invention.
Figure 16B:
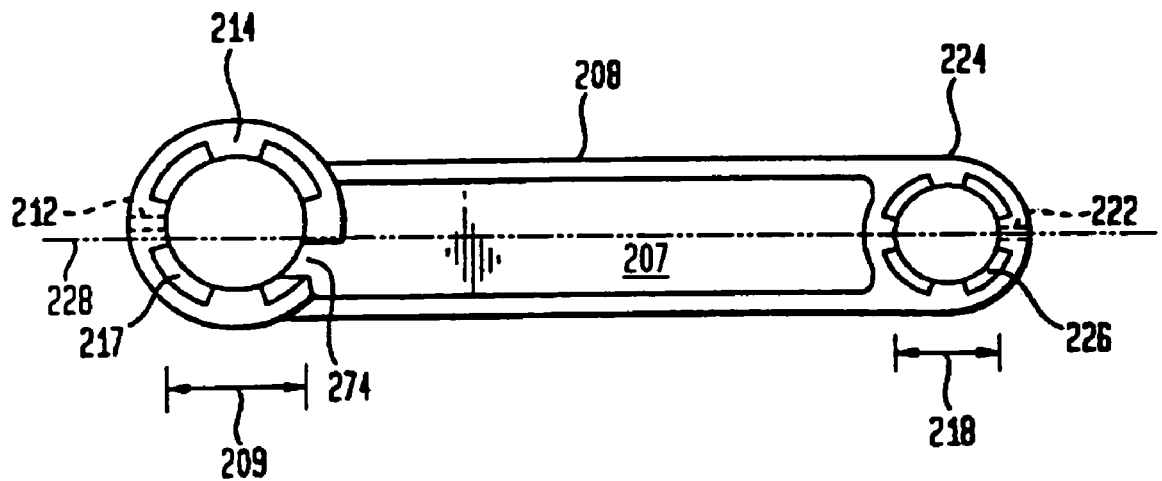

With reference to FIGS. 16a and 16b, the forearm extension 110 includes a body 140 having a first female coupling 142 located on a first end and a second female coupling 144 located on a second end. The first female coupling 142 has an inner diameter 209 that is sized to rotatably engage the hollow shaft 268 of the second endcap 108. The first female coupling 142 is also configured to receive a cable through the hollow shaft 268. That is, the first female coupling 142 has a cable slot 274 formed therein, for example by milling the cable slot 274 into the first female coupling 142, or by casting the first female coupling 142 with the cable slot 274 integrally formed therein.

The first female coupling 142 preferably has a set screw 212 formed within a wall 214 thereof. The set screw 212 can be tightened to prevent the first female coupling 142 from rotating about the hollow shaft 268. Advantageously, the first female coupling 142 has a plurality of voids 217 formed in the wall 214, which saves on material costs and permits the forearm extension 110, when cast, to be cooled more quickly. The quicker cooling enables the production quantity to be increased.

Figure 17A:
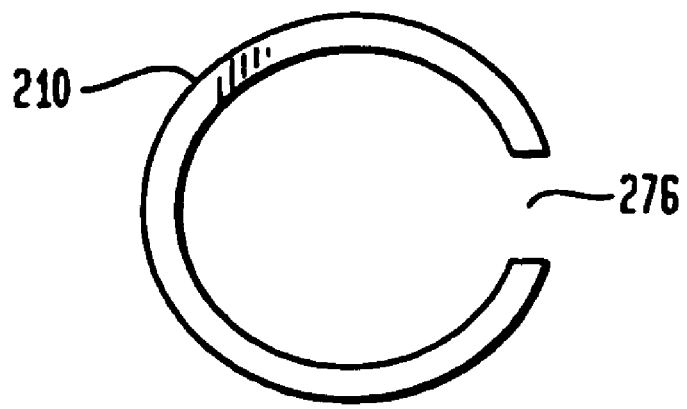
FIGS. 17a–b, illustrate several views of a bushing used in a second female coupling of the extension arm illustrated in FIGS. 16a–b.
Figure 17B:
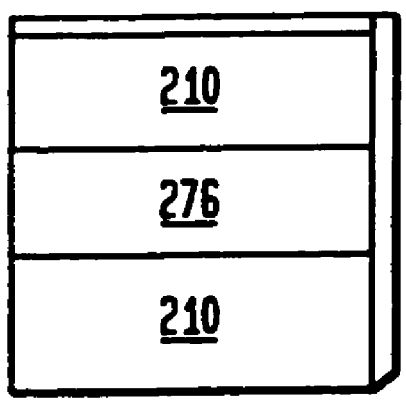

A bushing 210 (FIG. 8) is preferably used to engage the first female coupling 142 and the hollow shaft 268. That is, the bushing 210 is placed over the hollow shaft 268 and within the first female coupling 142. The bushing 210 is preferably made of a smooth material, such as plastic, in order to reduce friction and prevent metal to metal contact. As illustrated in FIGS. 17a and 17b, the bushing 210 also has a cable slot 276 formed therein. The cable slots 274, 276 are aligned so that a cable can pass therethrough. When the set screw 212 is tightened it causes the bushing 210 to flex inward and frictionally engage the hollow shaft 268 and thus prevent the forearm extension 110 from rotating about the hollow shaft 268. The hollow shaft 268 and the first female coupling 142 are held together by utilizing a screw 211 and a washer 213 (FIG. 8).

The body 140 preferably has an inverted U-shape with a topwall 207 and two sidewalls 208 so that a cable can be hidden therein. Advantageously attached within the U-shaped body 140, and preferably on the topwall 207, is a cable holder 278 (FIG. 8). The cable holder 278 secures a cable within the U-shaped body so that it can be hidden from view as it travels the length of the forearm extension 110.

The second female coupling 144 is for attachment to a device mounting (not shown), such as a tilter described in Applicant's co-pending patent application Ser. No. 09/406, 530 filed on Sep. 27, 1999 which is incorporated herein by reference in its entirety, a platform, or other means for supporting a flat-screen device. Thus, the second female coupling 144 has an inner diameter 218 that is sized to rotatably engage a shaft of the device mount. A bushing 220

(FIG. 8), preferably made of a smooth material such as plastic, is placed over the shaft and within the second female coupling 144. The second female coupling 144 preferably has a set screw 222 formed within a wall 224 of the second female coupling 144. When the set screw 222 is tightened it causes the bushing 220 to flex inward and frictionally engage the shaft and thus prevent the device mount from rotating around the second female coupling 144. Advantageously, the second female coupling 144 also has a plurality of voids 226 formed in the wall 224.

The embodiment of the forearm extension 110 illustrated in FIGS. 16a and 16b, has the topwall 207 flush with an upper edge of the female couplings 142, 144. Since the first female coupling 142 is larger than the second female coupling, the center of the first female coupling 142 is not aligned with the center of the second female coupling 144 or an axial centerline 228 of the body 140. It should be noted that an alternative embodiment is to have the center of the female couplings 142, 144 and the axial centerline 228 of the body 140 all aligned, so that the topwall 207 would not be aligned with an upper edge of the first female coupling 142.

The embodiment illustrated in FIG. 16a, has the body 140 horizontally disposed between the female couplings 142, 144 when the axial centerlines of the female couplings 142, 144 are vertically disposed. It should be noted however that the body 140 is not limited to be horizontally disposed and may be disposed at an incline in this embodiment.

The present invention permits a flat-screen device which is mounted to a wall to be flattened against the wall while hiding the extension arm 100 within the shadow of the device. That is, the forearm extension 110 may be folded into a position which is directly above the upper and the lower channels 104, 106. As a result, the mounted device is flush to the mounting surface and substantially hides the parallelogram, formed by the first and the second endcaps 102, 108 and the upper and the lower channels 104, 106, as well as the forearm extension 110 from view. Thus, the aesthetic appeal of the extension arm 100 is increased and the space occupied by the extension arm 100 and the device is minimized.

Referring back to FIG. 9, a flat-screen monitor 300 is attached to a tilter 302 which is rotatably coupled to the second female coupling 144. A cable 304, such as a power cable, proceeds from the monitor 300 to the underside off the U-shaped body 140 of the forearm extension 110. The cable 304 is held in place within the U-shaped body 140 by the cable holder 278. The cable 304 proceeds from the body through the cable slots 274, 276 in the bushing 210 and the first female coupling 142. The cable then proceeds through the hollow shaft 268 of the second endcap 108. The cable exits the second endcap 208 through the open end of the partially enclosed housing 250. The cable proceeds down the length of the lower channel 106 and exits at the first end 197 of the cable channel 196.

Preferably, the cable 304 is inserted into the extension arm 100 as portions of the extension arm 100 are being assembled. That is, the cable 304 is placed under the U-shaped body 140 of the forearm extension 110 and is held in place by the cable holder 278. The cable is then passed through the cable slots 274, 276. The cable 304 including the plug 306 is then fed through the hole 260 in the second endcap 108. The second endcap 108 is now assembled by inserting the mounting end 270 of each endcap adapter 266 into the hole 260, thus surrounding the cable 304. The endcap adapters 266 are held together and within the hole 260 by tightening the set screws 264. The hollow shaft 268 is then placed within the first female coupling 142. The cable 304 is placed within the lower channel secured together. This ensures that the cable 304 is above the roller 136 and is contained within the hollow bar formed by the upper channel 104 and the lower channel 106.

Referring back to FIG. 8, several additional components of the extension arm 100 are discussed. For aesthetic purposes, a bumper 280 may be placed on the second endwall 256 of the second endcap 108 and a plug 282 may be placed over the first female coupling 142. A washer 284 may be placed over the two endcap adapters 266 to help secure them together.

Referring to FIGS. 18a–b, the upper channel 104 is constructed to optionally include internal reinforcements. This is particularly advantageous when mounting heavy electronic devices to the extension arm, for example, large computer monitors of the CRT type. Internal within the upper channel 104 is a rib assembly including a plurality of cross-ribs 400 and angularly disposed secondary ribs 402. By way of example, the cross-ribs 400 are disposed transverse to the sidewalls 182, while the secondary ribs 402 are disposed at an angle so as to form a triangular internal support structure. The cross-ribs 400 and secondary ribs 402 may be formed as an integral member which can be inserted into the upper channel 104. Preferably, the cross-ribs 400 and secondary ribs 402 are integrally cast during formation of the upper channel 104.

Figure 19:
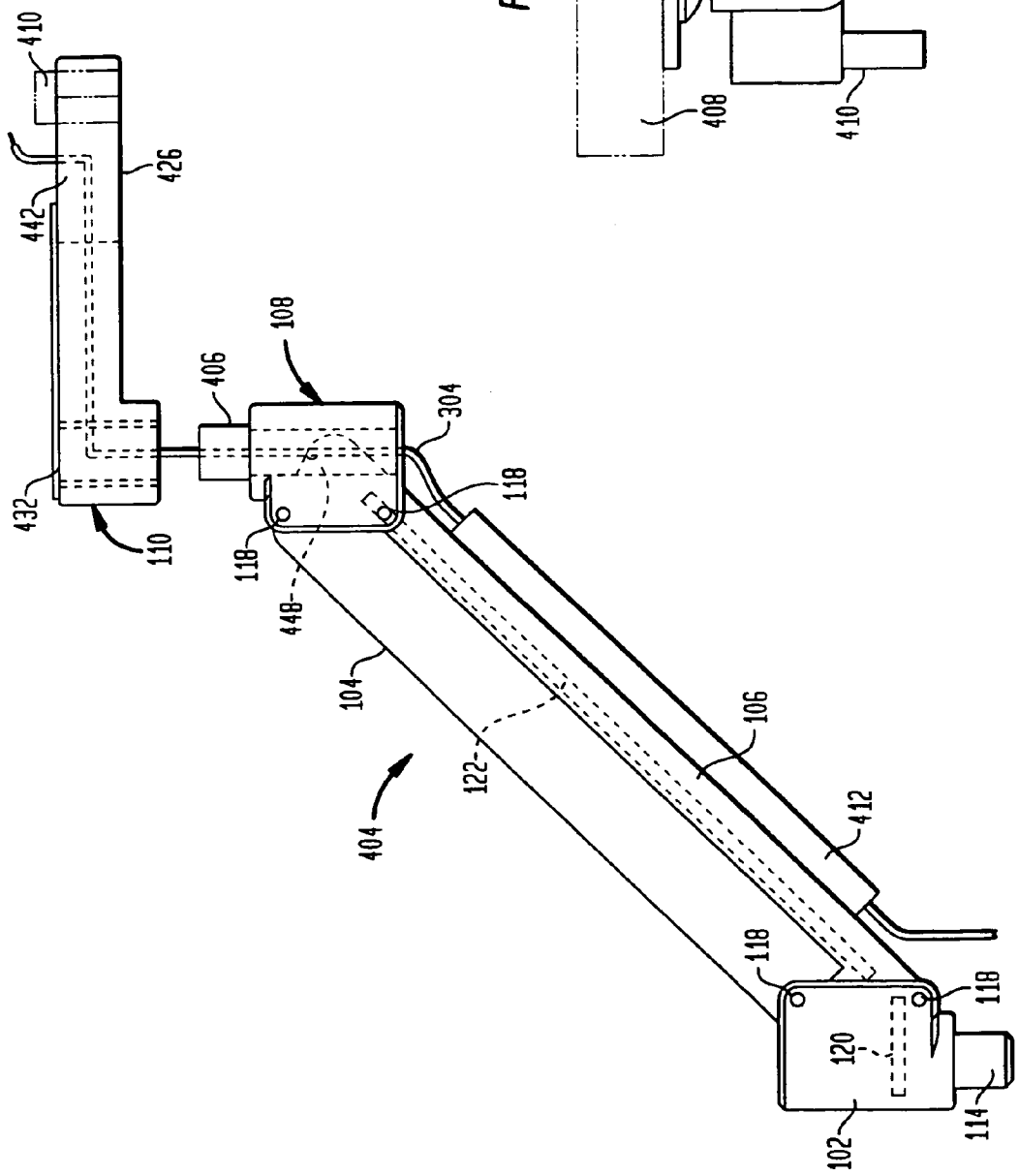
FIG. 19 is an assembly drawing of an extension arm for mounting a device thereto in accordance with one embodiment of the invention.

Referring to FIG. 19, there is illustrated an extension arm 404 constructed in accordance with another embodiment of the present invention, wherein like reference numerals represent like elements with respect to the extension arm 100 shown in FIGS. 8 and 9. Generally as shown, the extension arm 404 includes a first endcap 102, nested upper and lower channels 104, 106, a second endcap 108 and a forearm extension 110. Briefly, as thus far described with reference to extension arm 100, the first endcap 102 is mountable to a support structure such as, by way of example, endcap shaft 114. The shaft 114 is configured to be inserted for pivotable rotation to a support mount (not shown), such as previously discussed and as disclosed in Applicant's co-pending U.S. patent application Ser. No. 09/406,531.

The upper and lower channels 104, 106 are nested together to permit relative sliding movement therebetween in both longitudinal and transverse direction. The upper and lower channels 104, 106 by virtue of their general U-shaped construction form therebetween an internal channel extending therethrough. The common ends of the upper and lower channels 104, 106 are pivotably attached to the first endcap 102 by means of pins 118 as previously described. Similarly, the other common ends of the upper and lower channels 104, 106 are pivotably attached to the second endcap 108 by means of pins 118. A gas spring 122 of the hydraulic type is received within the channel formed between the upper and lower channels 104, 106 and attached to the clevis 120 and upper channel 104 as previously described. The forearm extension 110 is rotatably mounted to the second endcap 108 about a hollow tubular member 406 as to be described hereinafter.

Figure 20:
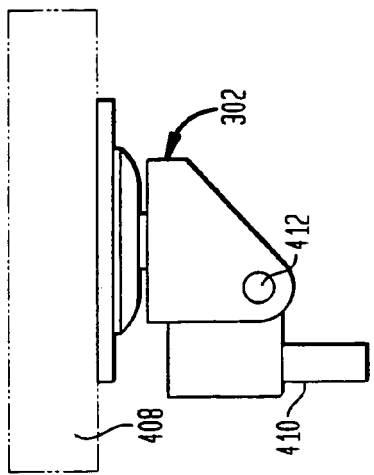
FIG. 20 illustrates a device mounting assembly for pivotable and rotatable adjustment.

As shown in FIG. 20, an electronic device 408 is attached to a tilter 302. The tilter, via its shaft 410 is rotatably mountable to the free end of the forearm extension 110. The tilter 302 includes a shaft 412 about which the electronic device 408 can be pivoted. As such, the tilter 302 enables the rotation and pivoting or tilting of the electronic device 408 into a desired orientation. One such tilter 302 is described and disclosed in Applicant's co-pending U.S. patent application Ser. No. 09/406,350 filed on Sep. 27, 1999, the disclosure of which is incorporated herein by reference.

Figure 21:
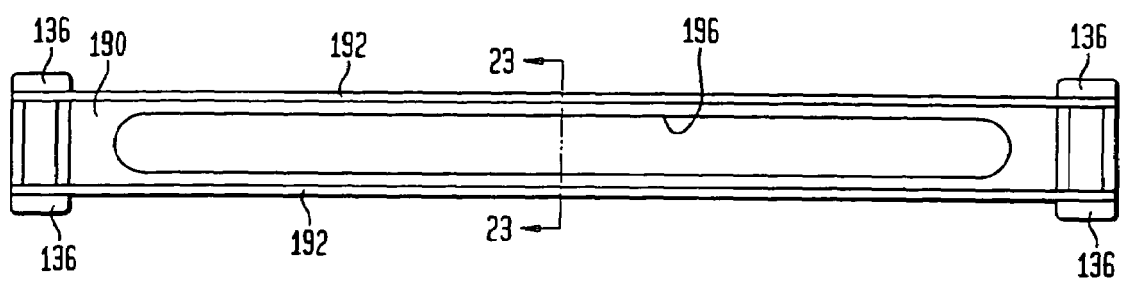
FIG. 21 illustrates a bottom view of the lower channel according to one embodiment of the invention.
Figure 22:
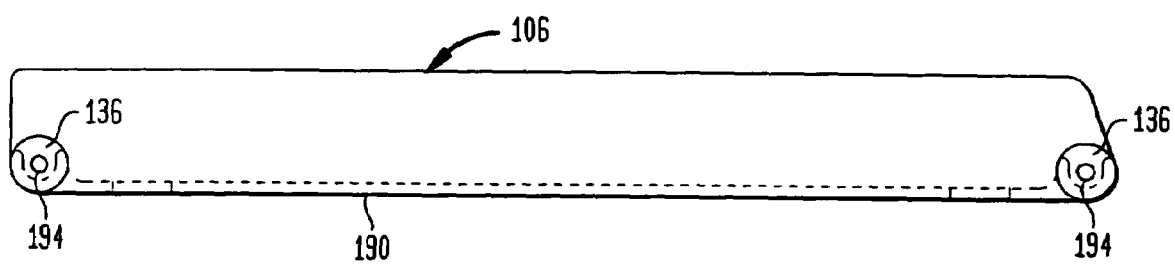
FIG. 22 illustrates a side view of the lower channel in accordance with one embodiment of the invention.
Figure 23:
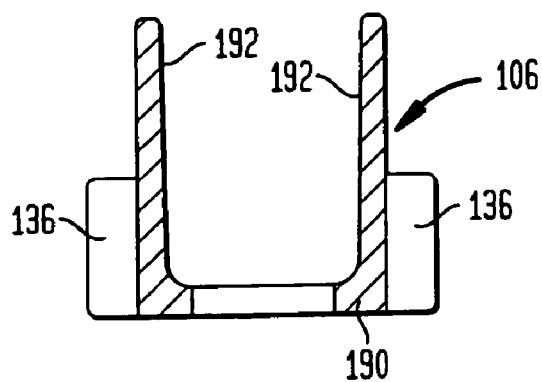
FIG. 23 illustrates a cross-sectional view of the lower channel taken along line 23—23 in FIG. 21.

Turning to FIGS. 21–23, there is illustrated the construction of the lower channel 106 in accordance with one embodiment of the invention. It is to be understood that the lower channel 106 is generally of similar construction as thus far described. In this regard, the lower channel 106 includes a U-shaped body having rollers 136 disposed at opposite ends. In accordance with the preferred embodiment, the rollers 136 are integrally cast in forming the lower channel 106. The lower channel includes a channel bottom 190 from which extends two channel sidewalls 192. The rollers 136 have a hole 194 therethrough for receiving a connection mechanism such as the pins 118.

Figure 33:
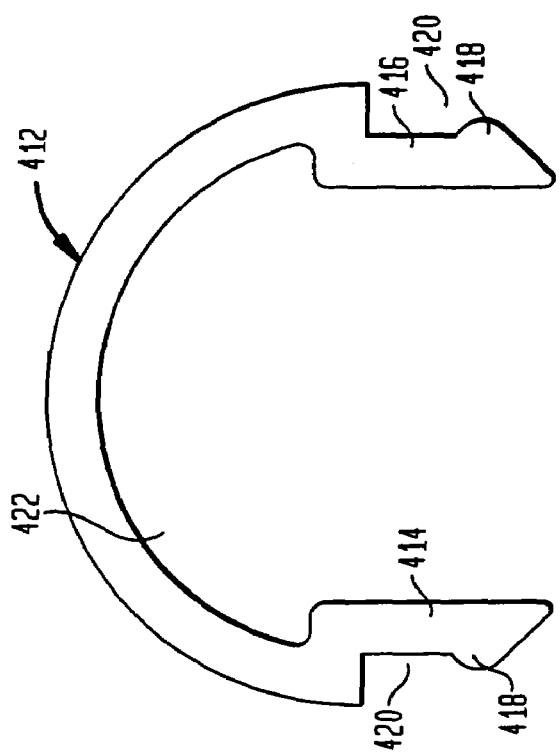
FIG. 33 illustrates one view of a cover member according to one embodiment of the invention.

The channel bottom 190 additionally includes a cable channel 196 running longitudinally therealong. In the embodiment shown, the cable channel 196 extends along the length of the channel bottom 190, terminating inwardly and adjacent the rollers 136. One or both of the ends of the cable channel 136 may be rounded or having a key-hole shape. The cable channel 196 is configured to receive a cable cover 412 as shown in FIG. 33. Thus, cables 304 of the mounted electronic device 408 may be wholly or partially retained within the lower channel 106 so as to hide them from view and protect them from harm. Where the cables 304 are placed externally of the lower channels 106, they are covered and protected by the cable cover 412.

As shown in FIG. 33, the cable cover is formed as an elongated U-shaped body having spaced apart legs 414, 416. The ends of the legs 414, 416 are provided with an outwardly extending bump 418 which forms a side recess 420. The cable cover 412 is removably attached to the lower channel 106 by inserting the legs 414, 416 through the cable channel 196. The edges of the channel bottom 190 will be received within the side recesses 420 after the legs 414, 416 are deflected inwardly by engagement with the bumps 418.

The cable cover 412 forms an elongated opening 422 overlying the cable channel 196. It is contemplated that in certain applications, a cable 304 may be strung through the interior of the lower channel 106 when assembling the extension arm 404. In certain other applications, the construction of the lower channel 106 and gas spring 120 will limit the space within the lower channel for accommodating a cable 304. In this regard, the cable channel 196 and opposing opening 422 will provide additional space for receiving the cable. Further in this regard, in an application where the extension arm 404 is fully assembled, it might not be possible to thread a cable through the lower channel 106. As such, the cable 304 can be extended overlying the cable channel 196 and contained within the opening 422 of the cable cover 412. It is also further contemplated that the cable 304 can be threaded through the interior of the lower channel 106 and directly into the interior of the second endcap 108 or outwardly through the cable channel 196. This is particularly facilitated when installing cable 304 during the assembly of the extension arm 404 as to be described hereinafter.

Figure 24:
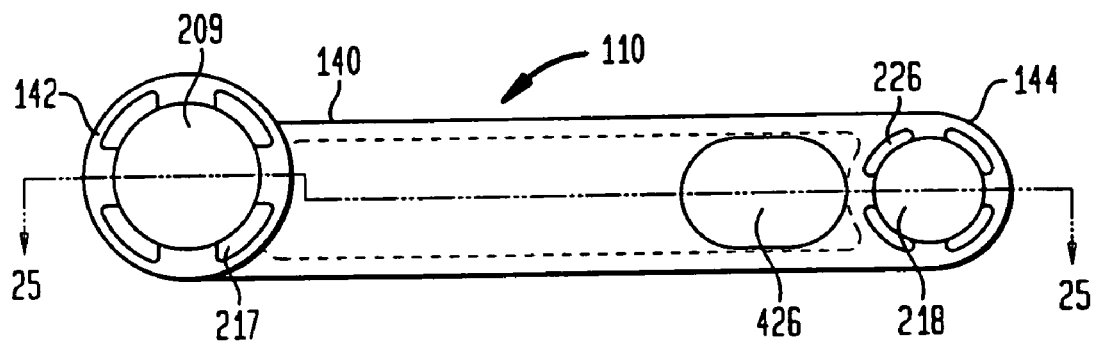
FIG. 24 illustrates one view of a forearm extension according to one embodiment of the invention.
Figure 25:
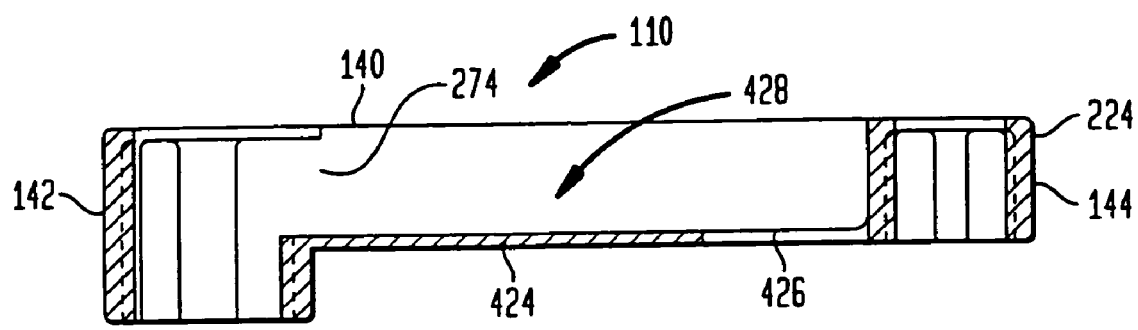
FIG. 25 illustrates a cross-sectional view of the forearm extension taken along line 25—25 in FIG. 24.

FIGS. 24 and 25 illustrate the construction of a modification of the forearm 110 as shown in FIGS. 16a and 16b. The forearm extension 110, as modified, includes a bottom wall 424 which extends from the first female coupling 142 to the second female coupling 144. In accordance with one embodiment, the bottom wall 424 is provided with an opening 426 arranged adjacent the second female coupling 144. The forearm extension 110 is provided with an open top forming an opening 428 extending from the first female coupling 142 to the second female coupling 144 and over the opening 426 in the bottom wall 424.

The opening 428 which extends through the forearm extension 110 is wholly or partially closed by a removable cable cover 430 as shown in FIGS. 26 and 27. The cable cover 430 includes a top wall 432 from which there depends a plurality of ribs 434 of different length and height. The topwall 432 of the cable cover 430 is formed from an elongated section 436 and a circular section 438. The circular section 438 is adapted to be disposed over the female coupling 142, while the elongated section 436 is adapted to be received over the adjacent portion of the forearm extension 110. The ribs extend inwardly into the opening 428 and are sized so as to engage the sidewalls forming the forearm extension 110 and first female coupling 142. The friction fit effected by the ribs 434 maintains the cable cover 430 in position overlying the opening 428. The cable cover 430 has an end 440 which as shown is a semicircular section. However, it is to be understood that the end 440 may be straight or other shaped. The end 440, when the cable cover 430 is in position, terminates short of the location of the second female coupling 142 as shown in FIG. 19. As a result, an opening 442 is provided between the end 440 of the cable cover 430 and the second female coupling 144. It is not a requirement that opening 442 be overlying or in alignment with opening 426 in the bottom wall 424.

Figure 32:
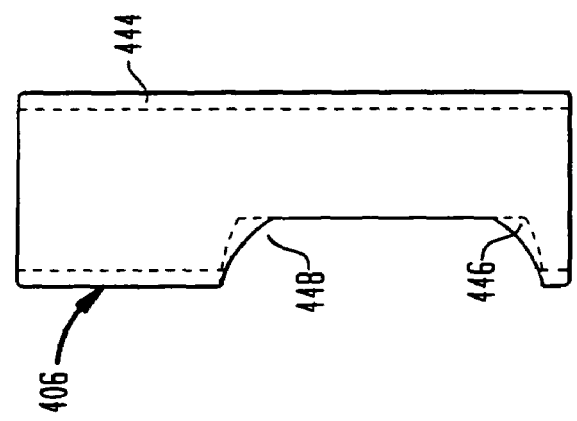
FIGS. 31–32 illustrate several views of a tubular member for assembly in the endcap in accordance with one embodiment of the invention.
Figure 31:
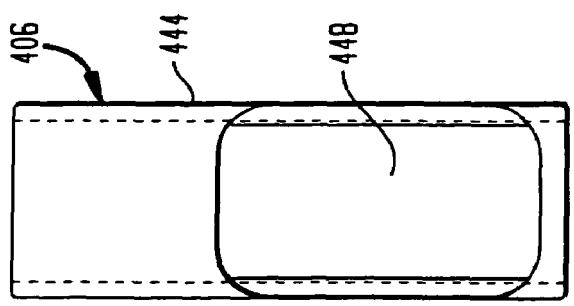

The forearm extension 110 is pivotably mounted to the second endcap 108 by rotationally receiving therein the free end of the tubular member 406 as shown in FIG. 19. Referring to FIGS. 31 and 32, the tubular member 406 is constructed from an elongated cylindrical body 444 having a hollow interior 446. A generally rectangular-shaped opening 448 is cut into the sidewall of the body 444 to provide communication to the hollow interior 446.

Figure 28:
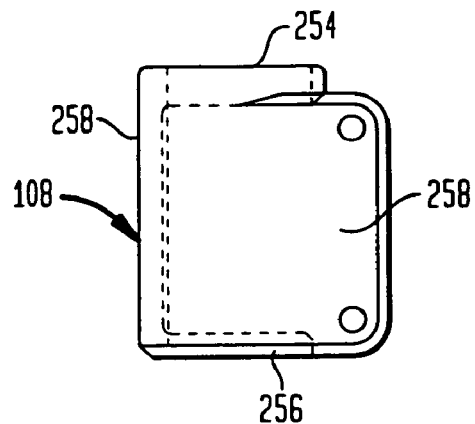
FIGS. 28–30 illustrate several views of an endcap in accordance with one embodiment of the invention.
Figure 29:
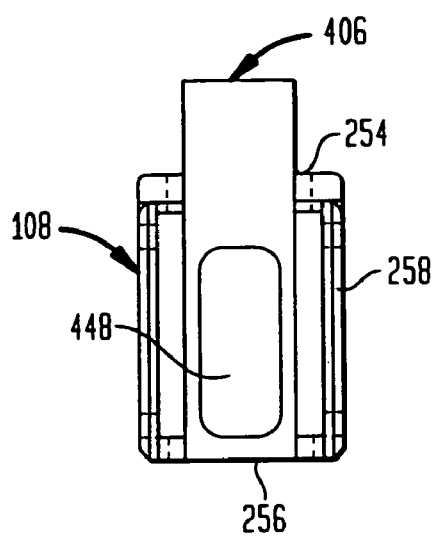
Figure 30:
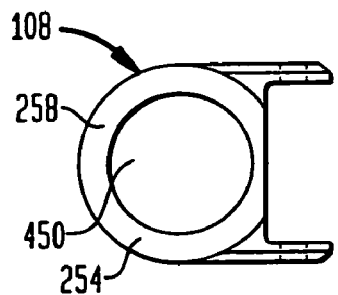

As shown in FIGS. 28–30, the second endcap 108 includes a partially enclosed housing including spaced apart first and second endwalls 254, 256 connected by sidewall 258. The sidewall 258 extends partially around the housing so as to form a cylindrical through hole 450 extending between the first and second endwalls 254, 256. The construction of the second endcap 108 is similar to that described with respect to the endcap shown in FIGS. 13a–13c.

The tubular member 406 is inserted into the opening 450 within the second endcap 108 as shown in FIG. 29. The rectangular opening 448 is aligned to allow access into the interior of the tubular member for feeding cable 304 therethrough.

Referring once again to FIG. 19, the cable 304 is concealed by passing through the interior of the second endcap 108. The cable 304 may extend into the interior of the second endcap 108 from either of two locations. For example, the cable 304 may run along the exterior of the lower channel member 106, being enclosed by cable cover 412. In this regard, all or a portion of the cable 304 may also be received within the interior of the lower channel 106 through the cable channel 196 therein. The cable 304 will then extend into the second endcap 108 through the opening in the second endwall 256. In addition, the cable 304 may extend wholly or partially within the lower channel 106, entering the second endcap 104 directly through the opening 448 in the tubular member 406.

The cable 304 extends into the interior of the forearm extension 110 through the first female coupling 142 to a location adjacent the free end where the tilter 302 is rotationally supported. The cable 304 exits from the forearm extension 110 through either of the openings 426, 442. The openings 426, 442 and the tubular member 406 are sized to allow the pin connector attached to the cable 304 for the electronic device to pass therethrough. The extension arms 100, 404 as thus far described provide a construction for the internal management of cables 304 to and from a support electronic device 408.

Figure 34:
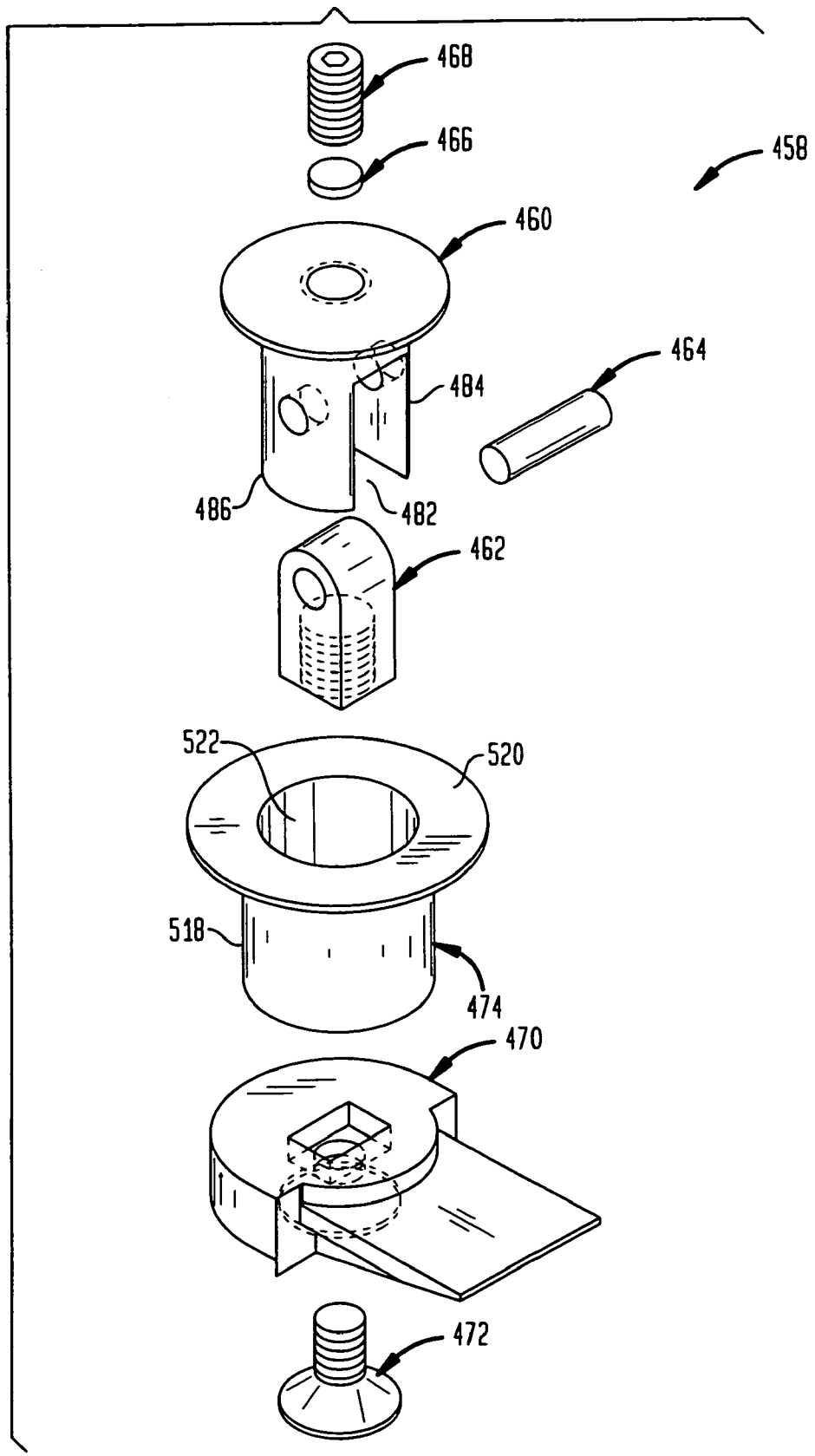
FIG. 34 is an exploded illustration showing the components of a tilter constructed in accordance with one embodiment of the present invention.

Turning now to FIGS. 34–47, there will be described a tilter 458 constructed in accordance with another embodiment of the present invention. As shown in FIG. 34, the tilter 458 includes a swivel bolt 460, a swivel lug 462, a dowel pin 464, a friction pellet 466, a set screw 468, an adapter 470, bolt 472, and optionally a mounting sleeve 474. In addition to the foregoing components, and as shown in FIGS. 45–47, there is provided an adapter mounting bracket 475.

Figure 35:
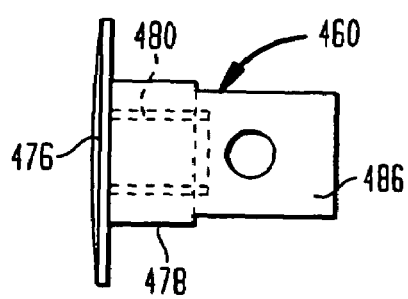
FIGS. 35–37 are various illustrations of a swivel bolt forming a component of the tilter shown in FIG. 34.
Figure 37:
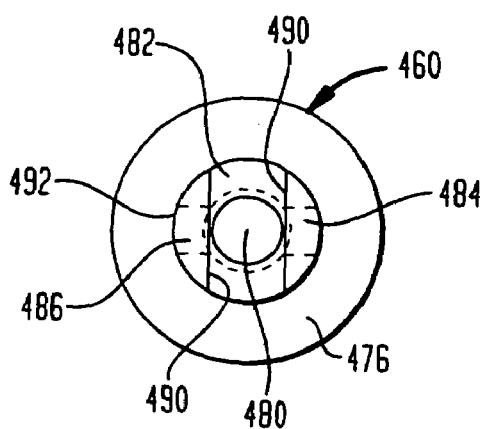
Figure 36:
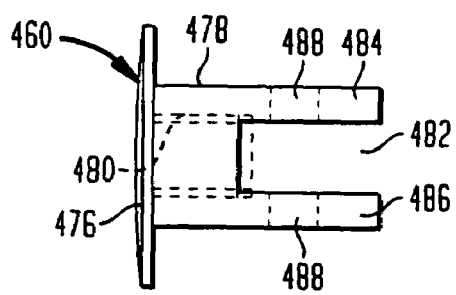

Turning to FIGS. 35–37, the swivel bolt 460 includes a top plate 476 which may be circular, rectangular, oval or any other shape as desired. Depending from the top plate 476 is a generally cylindrical body 478 having an upper portion provided with a threaded hole 480 and a lower portion provided with a rectangular cutout 482 which defines a pair of spaced apart legs 484, 486. The cutout 482 is in communication with the end of the threaded hole 480 which defines a receiving space for receiving a portion of the swivel lug 462. A hole 488 is arranged transversely through the legs 484, 486 in alignment with each other. As shown in FIG. 37, the legs 484, 486 are generally provided with flat planar parallel spaced apart inner surfaces 490 and outer curved surfaces 492.

Figure 38:
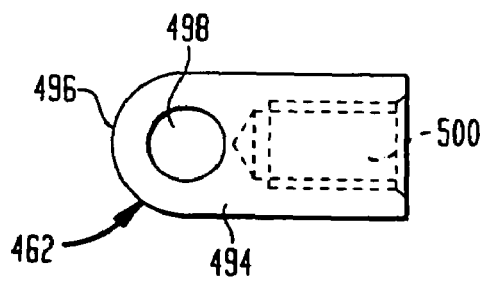
FIGS. 38 and 39 are various illustrations of a swivel lug forming a component of the tilter shown in FIG. 34.
Figure 39:
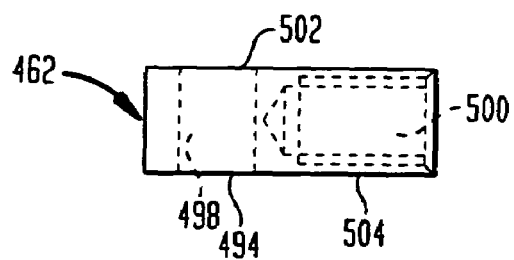
Figure 42:
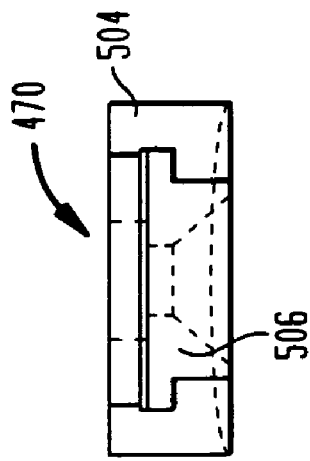
FIGS. 40–43 are various illustrations of a swivel adapter forming a component of the tilter shown in FIG. 34.

As shown in FIGS. 38 and 39, the swivel lug 462 is formed from a rectangular body 494 having a rounded upper end 496. A through hole 498 extends through the swivel lug 462 adjacent the upper end 496. The other end of the swivel lug 462 is provided with a threaded hole 500 which extends to a location adjacent the through hole 498. The threaded hole 500 is preferably not in communication with the through hole 498. The swivel lug 462, as shown in FIG. 39, is formed with a pair of spaced apart parallel planar surfaces 502, 504.

Figure 43:
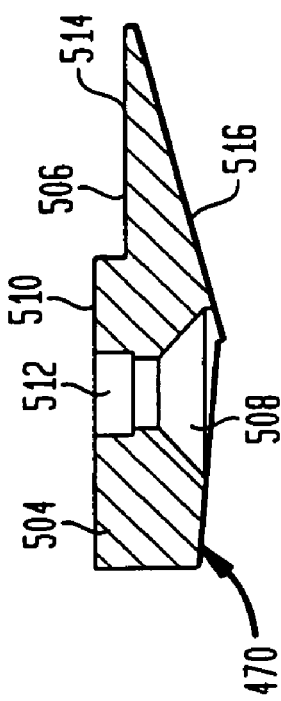
Figure 40:
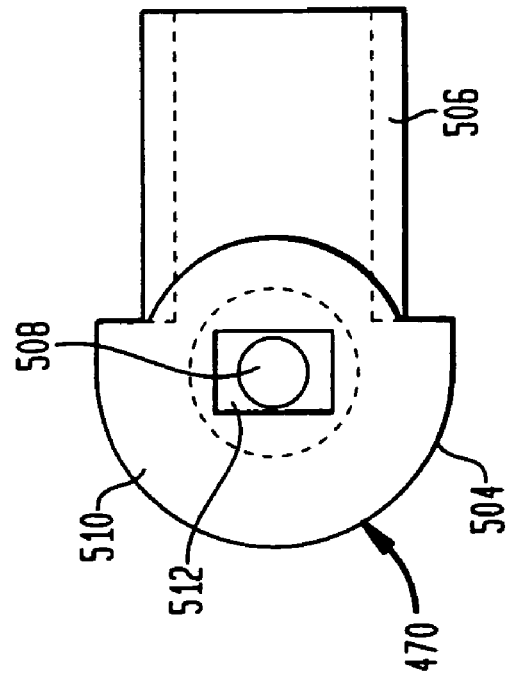
Figure 41:
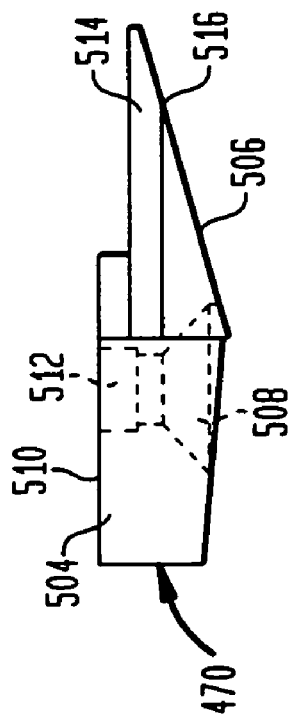

Turning to FIGS. 40–43, the adapter 470 includes a main body section 504 and a T-shaped extension 506. The main body section 504 includes a through opening 508. The through opening 508 adjacent the top surface 510 of the main body section 504 is provided as a rectangular-shaped opening 512. As best shown in FIG. 40, the rectangular-shaped opening 512 is of greater size than the adjacent portion of the through opening 508. The T-shaped extension 506 extends outwardly from the main body section 504. As best shown in FIGS. 41 and 43, the T-shaped extension 506 has a generally horizontal topwall 514 and a sloped bottom wall 516 providing a wedge-shaped profile.

Figure 44:
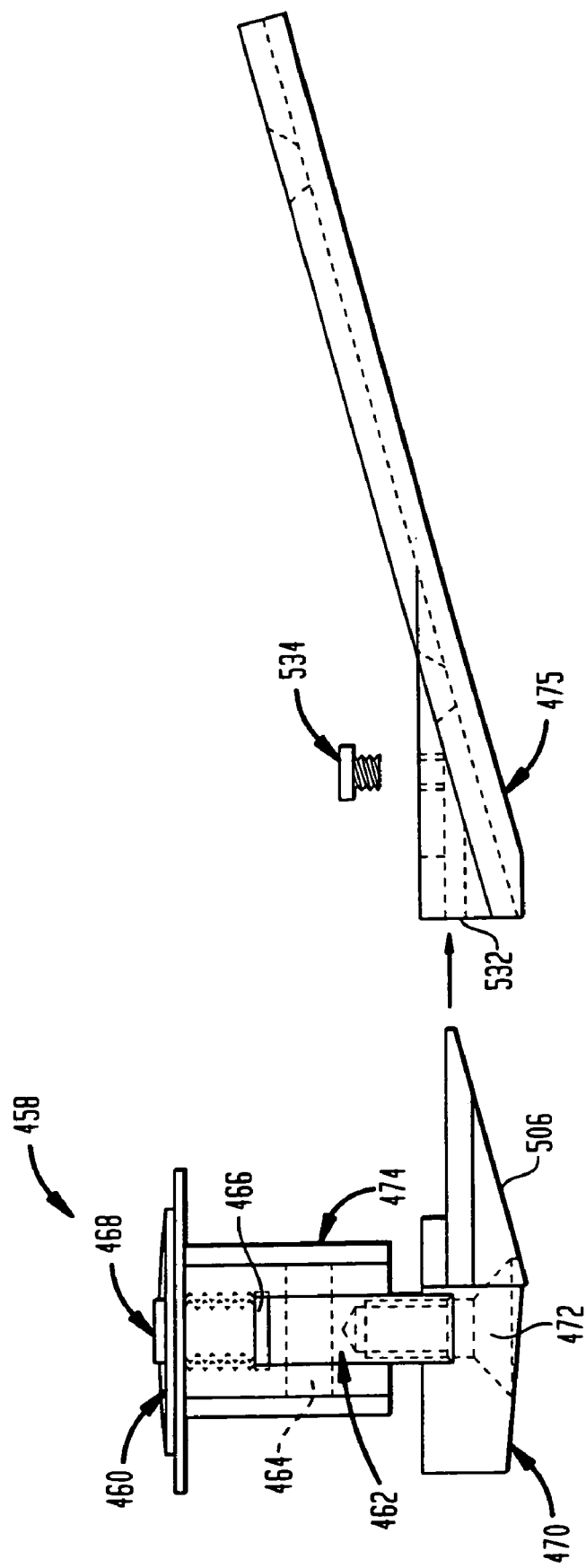
FIG. 44 illustrates the tilter shown in FIG. 34 in assembled relationship.

Referring to FIGS. 34 and 44, the assembly of the tilter 458 will now be described. The swivel lug 462 is inserted into the rectangular cutout 482 defined between legs 484, 486 of the swivel bolt 460. The upper end 496 is positioned adjacent and underlying the threaded hole 480. The swivel lug 462 is pivotably mounted to the swivel bolt 460 by inserting the cylindrical dowel pin 464 through the aligned holes 488, 498 in the swivel bolt and swivel lug. As shown in FIG. 44, this permits the swivel lug 462 to pivot about the dowel pin 464 into and out of the plane of the figure.

The friction pellet 466 is inserted into the bottom end of the threaded hole 480 in the swivel bolt 460 where it is supported by its engagement with the upper end 496 of the swivel lug 462. The threaded set screw 468 is inserted into the threaded hole 480 such that its end is in engagement with the upper surface of the friction pellet 466. Rotation of the set screw 468 will apply pressure on the friction pellet 466 which, in turn, will apply pressure to the swivel lug 462. The friction pellet 466 is preferably constructed of a polymer material so as to be resilient and capable of withstanding the forces imparted by the set screw 468. Upon applying sufficient force, the pivotable action of the swivel lug 462 may be arrested for adjustment purposes as to be described hereinafter.

The assembly as thus far described, i.e., the swivel bolt 460 and swivel lug 462, may be inserted into an adapter receiving support 474. As shown in FIG. 34, the adapter receiving support 474 is in the nature of a hollow cylindrical body having a generally planar flanged top 520. The cylindrical body 518 forms a cylindrical through hole 522 having a size and shape adapted to receive the body 478 of the swivel bolt 460. The length of the cylindrical body 518 allows a portion of the swivel lug 462 to extend outwardly therebeyond as shown in FIG. 44. The tilter 458 has been described thus far as including an adapter receiving support 474. The adapter receiving support 474 can be inserted into the opening 212 within the end of the forearm extension 110. However, it is to be understood that the adapter receiving support 474 may be eliminated. In this regard, the swivel bolt 460 will be inserted directly into the opening 218. As such, the adapter receiving support 474 can function as a liner or bearing for the opening 218 and can therefore be constructed from a variety of materials such as polymer materials, as well as metal if so desired.

The free end of the swivel lug 462 is inserted into the rectangular-shaped opening 512 within the adapter 470. The swivel lug 462 is secured thereat by threaded bolt 472 which is threaded into the threaded hole 500 of the swivel lug. The completed assembly of the tilter 458 is shown in FIG. 44. The adapter 470 is operative for rotation about the longitudinal axis of the swivel bolt 460. In this regard, the swivel bolt 460 will rotate within the adapter receiving support 474. To this end, it is preferable that the adapter receiving support 474 be constructed of polymer materials. In addition, the adapter 470 may be pivoted about the axis of the dowel pin 464 by means of the swivel lug 462. Accordingly, the adapter 470 can be both pivoted and rotated as desired.

The adapter 470 is releasably attached to a device mounting bracket 475. As shown in FIGS. 45–47, the mounting bracket 475 includes a plate 526 having a plurality of through holes 528. The through holes 528 may be arranged at various locations as desired. As shown in FIG. 47, the through holes 528 can be used for attaching the plate 526 to the rear surface of an electronic device 408, such as an LCD monitor, etc. Other attachment mechanisms such as screws, clamps may be used for attaching the plate 526 to the desired electronic device 408.

The plate 526 is provided at one end with a configured wall 530 which defines a T-shaped opening 532. The T-shaped opening 532 is sized and configured so as to receive the T-shaped extension 506 on the adapter 470. As shown in FIG. 44, the T-shaped extension 506 can be inserted into the T-shaped opening 532 and secured thereat by means of a bolt or set screw 534. In this manner, the electronic device 408 will be connected to the tilter 458 via the mounting bracket 475 to enable its rotation and pivoting or tilting as thus far described. The tilting orientation of the mounting bracket 475 can be fixed by tightening the set screw 468 to apply a sufficient force against the swivel lug 462 by means of the friction pellet 466.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A reinforced channel for use in an extension arm that mounts a device to a support, said channel comprising
   a U-shaped body having first and second spaced apart ends, said body including a pair of spaced apart sidewalls, each sidewall having an upper edge, and a bottom wall therebetween;
   and a rib assembly within said body between said sidewalls overlying said bottom wall, said rib assembly comprising a plurality of first ribs projecting upwardly from said bottom wall transversely from one of said sidewalls to the other said sidewall and a plurality of second ribs projecting upwardly from said bottom wall at an oblique angle to said sidewalls;
   wherein said rib assembly extends to a location below said upper edge on each sidewall.

2. The channel of claim 1, wherein said rib assembly is an integral assembly with said bottom wall.

3. The channel of claim 1, wherein said rib assembly is an integral assembly separate from said bottom wall.

4. The channel of claim 3, wherein said rib assembly further includes a pair of spaced apart side ribs, said first and second ribs connected therebetween.

5. The channel of claim 4, wherein said side ribs are an integral assembly with said first and second ribs.

6. The channel of claim 1, further including a first roller at said first end of said body and a second roller at said second end of said body.

7. The channel of claim 1, wherein said first and second ribs form triangular shaped openings therebetween.

8. The channel of claim 1, wherein said first and second ribs comprise elongated ribs.

9. A reinforced channel for use in an extension arm that mounts a device to a support, said channel comprising a U-shaped body having first and second spaced apart ends, said body including a pair of spaced apart sidewalls and a bottom wall therebetween; a first roller at said first end of said body and a second roller at said second end of said body; and a rib assembly within said body between said sidewalls overlying said bottom wall, said rib assembly comprising a plurality of first ribs projecting upwardly from said bottom wall transversely between said sidewalls and a plurality of second ribs projecting upwardly from said bottom wall at an oblique angle to said sidewalls, wherein said first and second rollers and said rib assembly are an integral assembly with said U-shaped body.

10. The channel of claim 9, wherein said rib assembly further includes a pair of spaced apart side ribs, said first and second ribs connected therebetween.

11. The channel of claim 10, wherein said first and second ribs form triangular shaped openings therebetween.

12. A reinforced channel for use in an extension arm that mounts a device to a support, said channel comprising
   a U-shaped body having first and second spaced apart ends, said body including a pair of spaced apart sidewalls, each sidewall having an upper edge and a bottom wall therebetween;
   and a plurality of ribs within said body between said sidewalls projecting upwardly from said bottom wall;
   wherein said plurality of ribs extend to a location below said upper edge, said ribs forming an open channel extending between said first and second ends of said body between said upper edges of said sidewalls and said plurality of ribs.

13. The channel of claim 12, wherein said ribs are integral with said bottom wall.

14. The channel of claim 12, wherein said ribs are separate from said bottom wall.

15. The channel of claim 14, wherein said ribs further include a pair of spaced apart side ribs.

16. The channel of claim 12, further including a first roller at said first end of said body and a second roller at said second end of said body.

17. The channel of claim 16, wherein said first and second rollers and said ribs are integral with said body.

18. The channel of claim 1, wherein said ribs form triangular shaped openings therebetween.

19. A reinforced channel assembly for use in an extension arm that mounts a device to a support, said channel assembly comprising first and second channels each including a U-shaped body having first and second ends, each said body including a pair of spaced apart sidewalls and a bottom wall therebetween, wherein said first channel is longitudinally nested within said second channel forming a longitudinal opening therebetween; and a rib assembly within at least one of said U-shaped bodies between the sidewalls thereof overlying the bottom wall thereof, said rib assembly comprising a plurality of first ribs projecting upwardly from said bottom wall transversely between said sidewalls and a plurality of second ribs projecting upwardly from said bottom wall at an oblique angle to said sidewalls.

20. The channel assembly of claim 19, wherein said rib assembly is an integral assembly with said bottom wall.

21. The channel assembly of claim 19, wherein said rib assembly is an integral assembly separate from said bottom wall.

22. The channel assembly of claim 19, wherein said rib assembly further includes a pair of spaced apart side ribs, said first and second ribs connected therebetween.

23. The channel assembly of claim 19, wherein said side ribs are an integral assembly with said first and second ribs.

24. The channel assembly of claim 19, wherein said first channel includes a first and second roller at the first and second ends thereof and said second channel includes a third and fourth roller at the first and second ends thereof.

25. The channel assembly of claim 24, wherein said first and second roller and said rib assembly are an integral assembly with said first channel.

26. The channel assembly of claim 19, wherein the sidewalls of said first channel are arranged overlying the sidewalls of said second channel when said first and second channels are nested together.

27. The channel assembly of claim 26, further including first and second spaced apart endcaps, wherein one end of said first and second channels are pivotably attached to said first endcap and the other end of said first and second channels are pivotably attached to said second endcap.

28. A reinforced channel assembly for use in an extension arm that mounts a device to a support, said channel assembly comprising first and second channels each including a U-shaped body having first and second ends, each said body including a pair of spaced apart sidewalls and a bottom wall therebetween, wherein said first channel is longitudinally nested within said second channel forming a longitudinal opening therebetween; and a plurality of ribs within at least one of said U-shaped bodies between the sidewalls thereof projecting upwardly from said bottom wall.

29. The channel assembly of claim 28, wherein said ribs are integral with said bottom wall.

30. The channel assembly of claim 28, wherein said ribs are separate from said bottom wall.

31. The channel assembly of claim 30, wherein said ribs further includes a pair of spaced apart side ribs.

32. The channel assembly of claim 28, wherein said first channel includes a first and second roller at the first and second ends thereof and said second channel includes a third and fourth roller at the first and second ends thereof.

33. The channel assembly of claim 32, wherein said first and second roller and said ribs are an integral assembly with said first channel.

34. The channel assembly of claim 28, wherein the sidewalls of said first channel are arranged overlying the sidewalls of said second channel when said first and second channels are nested together.

35. The channel assembly of claim 34, further including first and second spaced apart endcaps, wherein one end of said first and second channels are pivotably attached to said first endcap and the other end of said first and second channels are pivotably attached to said second endcap.

36. The channel of claim 12 wherein said channel is adapted to receive a gas spring extending between said first and second ends of said body.

* * * * *

(12) EX PARTE REEXAMINATION CERTIFICATE (7190th)
United States Patent
Oddsen, Jr.

(10) Number: US 7,066,433 C1
(45) Certificate Issued: Nov. 24, 2009

(54) ARM APPARATUS FOR MOUNTING ELECTRONIC DEVICES WITH CABLE MANAGEMENT SYSTEM

(75) Inventor: Odd N. Oddsen, Jr., Easton, PA (US)

(73) Assignee: Innovative Office Products, Inc., Easton, PA (US)

Reexamination Request:
No. 90/008,663, May 25, 2007
No. 90/009,050, Feb. 21, 2008

Reexamination Certificate for:
Patent No.: 7,066,433
Issued: Jun. 27, 2006
Appl. No.: 10/850,640
Filed: May 21, 2004

Related U.S. Application Data

(60) Division of application No. 10/448,769, filed on May 30, 2003, now Pat. No. 7,100,880, which is a division of application No. 09/776,355, filed on Feb. 2, 2001, now Pat. No. 6,609,691, which is a continuation-in-part of application No. 09/406,006, filed on Sep. 24, 1999, now Pat. No. 6,409,134.

(60) Provisional application No. 60/191,266, filed on Mar. 22, 2000, and provisional application No. 60/138,120, filed on Jun. 7, 1999.

(51) Int. Cl.
*F16M 11/00* (2006.01)

(52) U.S. Cl. .................................. 248/200; 248/300
(58) Field of Classification Search .................. None
See application file for complete search history.

(56) References Cited

U.S. PATENT DOCUMENTS

| 4,574,671 A | 3/1986 | Alessio |
| 5,149,035 A | 9/1992 | Bonnema et al. |
| 5,190,803 A | 3/1993 | Goldbach et al. ........... 428/138 |
| 5,402,973 A | 4/1995 | Haines .................... 248/188.7 |
| 5,529,645 A * | 6/1996 | Oswalt |
| 6,012,693 A | 1/2000 | Voeller et al. .......... 248/280.11 |

OTHER PUBLICATIONS

Expert Report of Dr. Philip Guichelaar Concerning Patent Invalidity.
DeGarmo, E. Paul, Materials and Processes in Manufacturing, Fourth Edition, 1974, pp. 227–291.
Hesse, Herman C., Engineering Tools and Processes, A Study of Production Technique, 1941, pp. 103–121 and pp. 357–382.
Hesse, Herman C., Engineering Tools and Processes, A Study of Production Technique, 1941, pp. 542–543.
The New Jersey Zinc Company, Practical Considerations in Die Casting Design, 1955, selected pages.
Reynolds Metals Company, Casting Aluminum, 1960, pp. 44–45.
Aluminum Company of America, Designing for Alcoa Forgings, pp. 47 and 89.
American Society for Metals, Forging Design Handbook, Jun. 1972, pp. 72 and 268.
Boothroyd et al., Product Design for Manufacture and Assembly, 1994, pp. 5–11.
Ullman, David G., The Mechanical Design Process, 1997, 2nd Ed., pp. 1–17.
Dieter, George E., Engineering Design, 2000, 3rd Ed., pp. 15–20 and 396–403.

(Continued)

*Primary Examiner*—Catherine S. Williams

(57) ABSTRACT

A channel for an adjustable extension arm for mounting an electronic device. The channel includes a U-shaped body having first and second spaced apart ends, including a pair of spaced apart sidewalls and a bottom wall. A rib assembly is provided within the body between the sidewalls overlying the bottom wall.

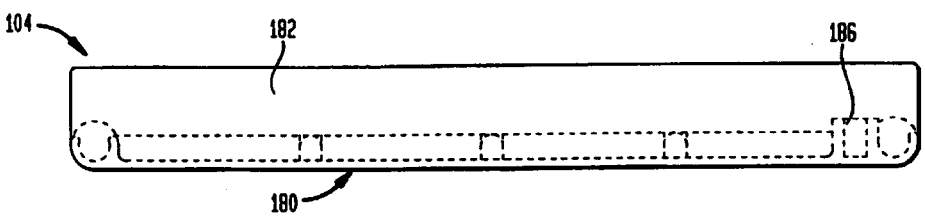

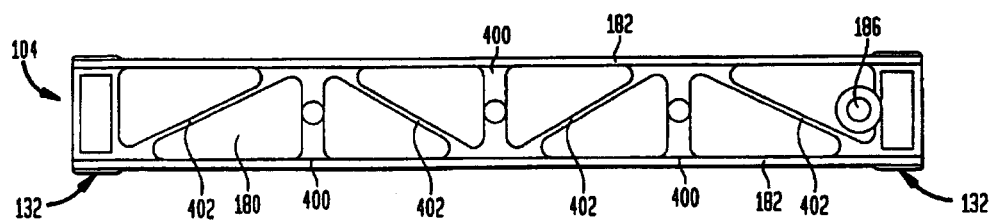

OTHER PUBLICATIONS

Roger W. Bolz, The Productivity Handbook, Fifth Ed., 1981, Chapters 2, 45 & 46.

*Innovative Office Products*, Inc. vs. *Ole Smed and Trade Management Group Limited.*, Answer of Trade Management Group Limited to Complaint for Patent Infringement, United States District Court, E.D. CA., Case EDCV 07–00192SGL (JCRx).

*Innovative Office Products*, Inc. vs. *SpaceCo, Inc.*, Memorandum—Aug. 23, 2007, United States District Court, E.D. Pa., Case 05–04037.

*Innovative Office Products*, Inc. vs. *SpaceCo, Inc.* and *Spaceco Business Solutions, Inc.*, Defendant's Supplemental Response to Plaintiff's First Set of Interrogatories (Nos. 3–16), United States District Court, E.D. Pa., Case 2:05–cv–04037–LS.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 16 and 24 are cancelled.

Claims 1, 9, 12, 17, 18, 19, 23, 25 and 28 are determined to be patentable as amended.

Claims 2, 6–8, 10–11, 13, 20, 22, 26–27, 29 and 32–36 dependent on an amended claim, are determined to be patentable.

Claims 3–5, 14–15, 21 and 30–31 were not reexamined.

1. A reinforced channel for use in an extension arm that mounts a device to a support, said channel comprising a U-shaped body having *a longitudinal axis, the longitudinal extent of said body defining* first and second spaced apart ends[,] *of* said body, *said body* including a pair of spaced apart sidewalls, each sidewall having an upper edge, and a bottom wall therebetween; and a rib assembly within said body between said sidewalls overlying said bottom wall, said rib assembly comprising a plurality of first ribs projecting upwardly from said bottom wall transversely from one of said sidewalls to the other said sidewall and a plurality of second ribs projecting upwardly from said bottom wall at an oblique angle to said sidewalls; wherein said rib assembly extends *from said bottom wall* to a location below said upper edge on each sidewall; *said rib assembly forming within said body an unobstructed channel extending from said first end to said second end between said upper edge of said sidewalls and said rib assembly*.

9. A reinforced channel for use in an extension arm that mounts a device to a support, said channel comprising a U-shaped body having first and second spaced apart ends, said body including a pair of spaced apart sidewalls and a bottom wall therebetween, *each of said sidewalls having an upper edge*; a first roller at said first end of said body and a second roller at said second end of said body; and a rib assembly within said body between said sidewalls overlying said bottom wall, said rib assembly comprising a plurality of first ribs projecting upwardly from said bottom wall transversely between said sidewalls and a plurality of second ribs projecting upwardly from said bottom wall at an oblique angle to said sidewalls, *wherein said rib assembly extends to a location below said upper edge of said sidewalls, said rib assembly forming an unobstructed channel within said body extending between said first and second rollers between said upper edges of said sidewalls and said rib assembly*, wherein said first and second rollers and said rib assembly are an integral assembly with said U-shaped body.

12. A reinforced channel for use in an extension arm that mounts a device to a support, said channel comprising a U-shaped body having first and second spaced apart ends, said body including a pair of spaced apart sidewalls, each sidewall having an upper edge and a bottom wall therebetween;

*a first roller at said first end of said body;*

*a second roller at said second end of said body;* and a plurality of ribs within said body between said sidewalls projecting upwardly from said bottom wall;

wherein said plurality of ribs extend to a lcoation below said upper edge, said ribs forming an [open] *unobstructed* channel extending between said first and second ends of said body between said upper edges of said sidewalls and said plurality of ribs.

17. The channel of claim [16] *12*, wherein said first and second rollers and said ribs are integral with said body.

18. The channel of claim [1] *12*, wherein said ribs form triangular shaped openings therebetween.

19. A reinforced channel assembly for use in an extension arm that mounts a device to a support, said channel assembly comprising first and second channels each including a U-shaped body having first and second ends, each said body including a pair of spaced apart sidewalls and a bottom wall therebetween, *each of said sidewalls having an upper edge, said first channel including a first roller at said first end of said body and a second roller at said second end of said body*, wherein said first channel is longitudinally nested within said second channel forming a longitudinal opening therebetween; and a rib assembly within [at least one of] said [U-shaped bodies] *first channel* between the sidewalls thereof overlying the bottom wall thereof, said rib assembly comprising a plurality of first ribs projecting upwardly from said bottom wall transversely between said sidewalls and a plurality of second ribs projecting upwardly from said bottom wall at an oblique angle to said sidewalls, *wherein said rib assembly extends to a location below said upper edges of said sidewalls of said first channel, said rib assembly forming an unobstructed channel extending between said first and second rollers between said upper edges of said sidewalls of said first channel and said rib assembly*.

23. The channel assembly of claim [19] *22*, wherein said side ribs are an integral assembly with said first and second ribs.

25. The channel assembly of claim [24] *19*, wherein said first and second roller and said rib assembly are an integral assembly with said first channel.

28. A reinforced channel assembly for use in an extension arm that mounts a device to a support, said channel assembly comprising first and second channels each including a U-shaped body [having] *having a longitudinal axis, the longitudinal extent of each said body defined by* first and second *spaced apart* ends, each said body including a pair of spaced apart sidewalls and a bottom wall therebetween, *each of said sidewalls having an upper edge*, wherein said first channel is longitudinally nested within said second channel forming a longitudinal opening therebetween; and a plurality of ribs within [at least one of] said [U-shaped bodies] *first channel* between the sidewalls thereof projecting upwardly from said bottom wall; *wherein said plurality of ribs extend to a location below said upper edges of said sidewalls of said first channel, said ribs forming an unobstructed channel extending between said first and second ends of said first channel between said upper edges of said sidewalls and said plurality of ribs.*

\* \* \* \* \*